United States Patent
Shin et al.

(10) Patent No.: US 11,948,241 B2
(45) Date of Patent: Apr. 2, 2024

(54) ROBOT AND METHOD FOR OPERATING SAME

(71) Applicant: LG ELECTRONICS INC., Seoul (KR)

(72) Inventors: Yongkyoung Shin, Seoul (KR); Yoonji Moon, Seoul (KR); Jinho Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 856 days.

(21) Appl. No.: 16/976,154

(22) PCT Filed: May 31, 2019

(86) PCT No.: PCT/KR2019/006614
§ 371 (c)(1),
(2) Date: Aug. 27, 2020

(87) PCT Pub. No.: WO2020/054945
PCT Pub. Date: Mar. 19, 2020

(65) Prior Publication Data
US 2020/0410739 A1 Dec. 31, 2020

(30) Foreign Application Priority Data
Sep. 14, 2018 (KR) .................. 10-2018-0110501

(51) Int. Cl.
*G06T 13/80* (2011.01)
*G05B 19/4155* (2006.01)
(Continued)

(52) U.S. Cl.
CPC .......... *G06T 13/80* (2013.01); *G05B 19/4155* (2013.01); *G06F 18/21* (2023.01);
(Continued)

(58) Field of Classification Search
CPC .............................. G06T 13/80; G06V 40/174
See application file for complete search history.

(56) References Cited

U.S. PATENT DOCUMENTS

2015/0381534 A1 12/2015 Morris et al.
2016/0361653 A1* 12/2016 Zhang .................. A63F 13/655
(Continued)

FOREIGN PATENT DOCUMENTS

KR  10-2009-0055425  6/2009
KR  10-2016-0116311  10/2016
(Continued)

OTHER PUBLICATIONS

Korean Office Action dated Jul. 21, 2020 issued in Application No. 10-2018-0110501.
(Continued)

*Primary Examiner* — Shivang I Patel
(74) *Attorney, Agent, or Firm* — KED & ASSOCIATES, LLP

(57) ABSTRACT

A robot and a method for operating the same according to one aspect of the present disclosure can provide emotion based services by acquiring data related to a user and recognizing emotional information on the basis of the data related to the user, and automatically generate a character expressing an emotion of the user by generating an avatar by mapping the recognized emotional information of the user to face information of the user.

20 Claims, 18 Drawing Sheets

(51) Int. Cl.
    *G06F 18/21*     (2023.01)
    *G06N 3/08*     (2023.01)
    *G06T 11/00*     (2006.01)
    *G06V 10/44*     (2022.01)
    *G06V 10/764*     (2022.01)
    *G06V 10/80*     (2022.01)
    *G06V 10/82*     (2022.01)
    *G06V 40/16*     (2022.01)
    *G10L 15/16*     (2006.01)
    *G10L 15/22*     (2006.01)
    *G10L 15/30*     (2013.01)
    *G10L 25/63*     (2013.01)

(52) U.S. Cl.
    CPC ............... *G06N 3/08* (2013.01); *G06T 11/00* (2013.01); *G06V 10/457* (2022.01); *G06V 10/764* (2022.01); *G06V 10/806* (2022.01); *G06V 10/82* (2022.01); *G06V 40/174* (2022.01); *G10L 15/16* (2013.01); *G10L 15/22* (2013.01); *G10L 15/30* (2013.01); *G10L 25/63* (2013.01); *G05B 2219/50391* (2013.01)

(56) References Cited

U.S. PATENT DOCUMENTS

2018/0027307 A1    1/2018    Ni et al.
2018/0089880 A1    3/2018    Garrido et al.
2018/0136615 A1*   5/2018    Kim .................. G06N 3/08

FOREIGN PATENT DOCUMENTS

KR    10-2017-0095817    8/2017
KR    10-1854431    5/2018
KR    10-2018-0079824    7/2018

OTHER PUBLICATIONS

International Search Report dated Sep. 24, 2019 issued in Application No. PCT/KR2019/006614.

* cited by examiner

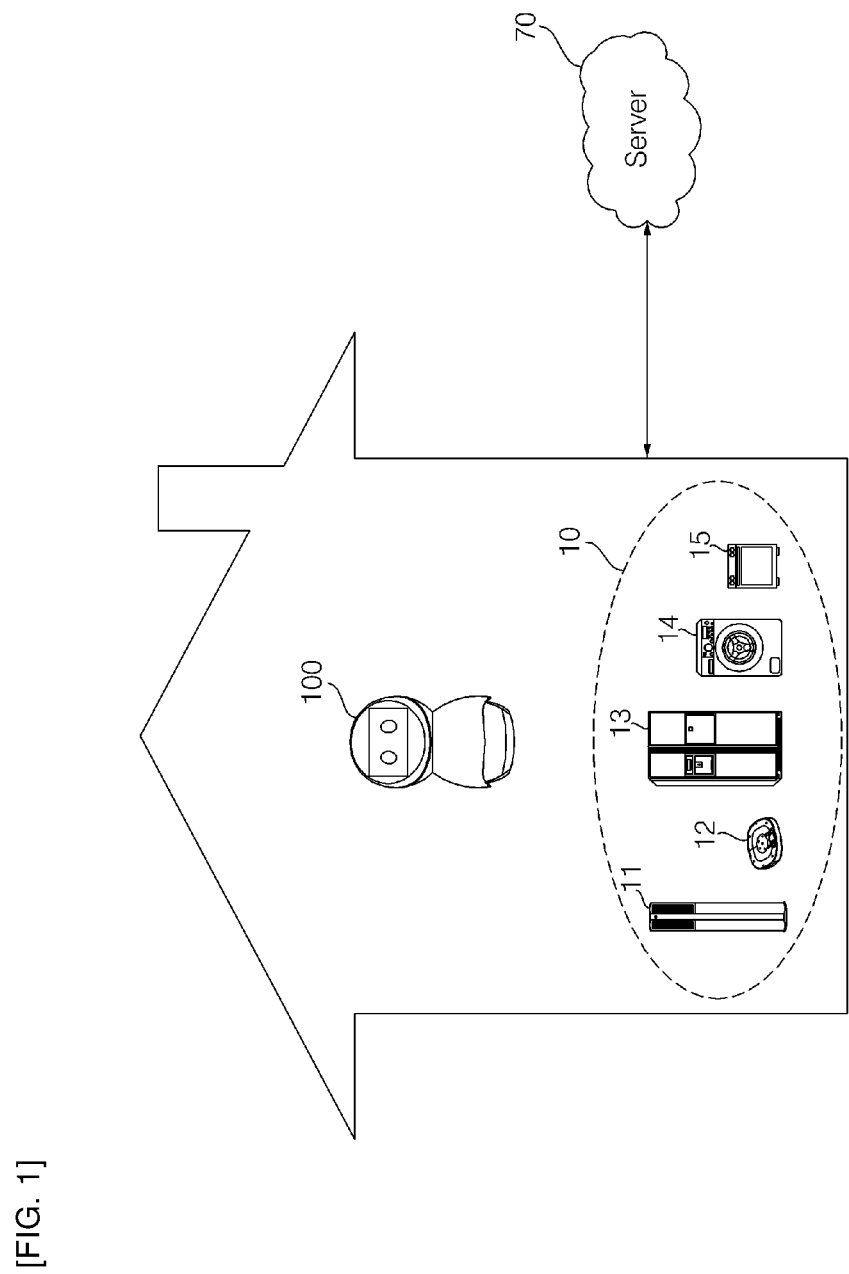
[FIG. 1]

[FIG. 2]
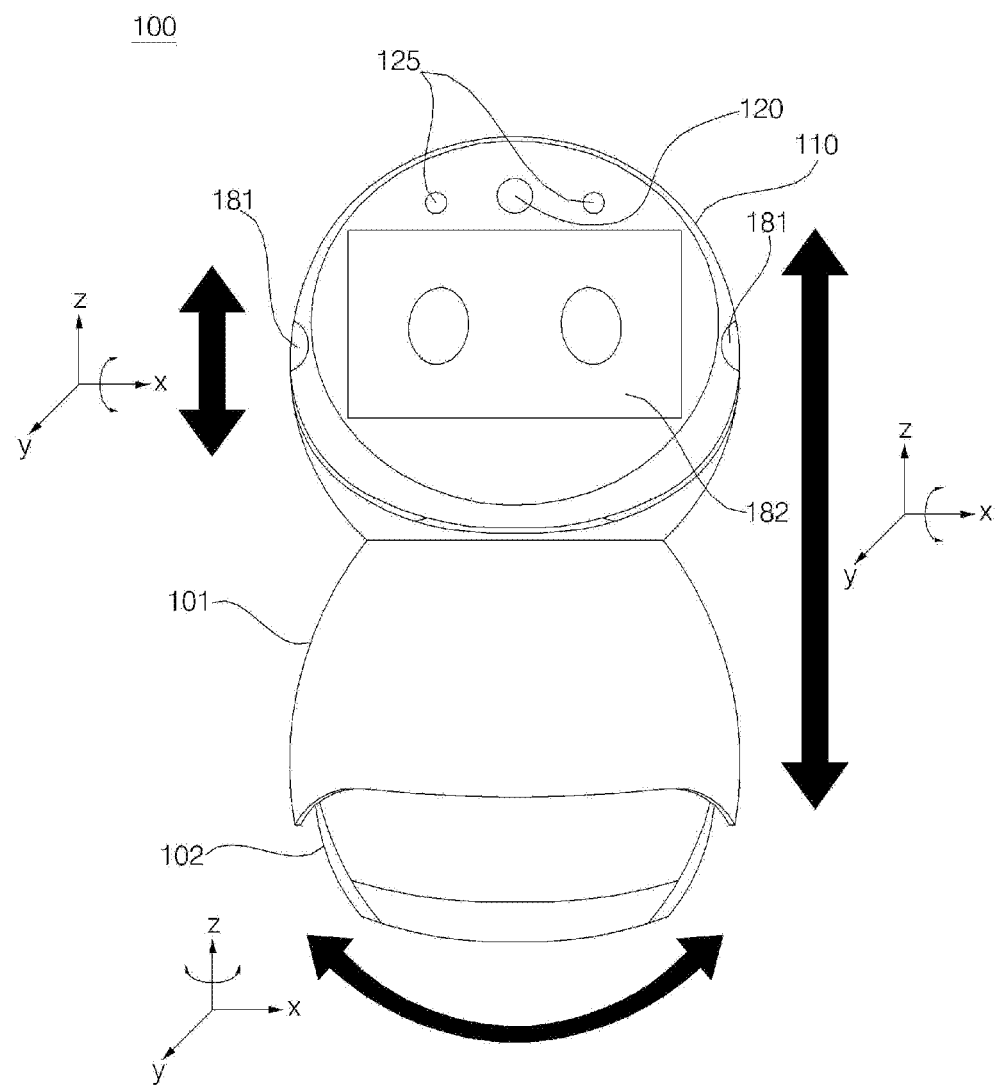

[FIG. 3]
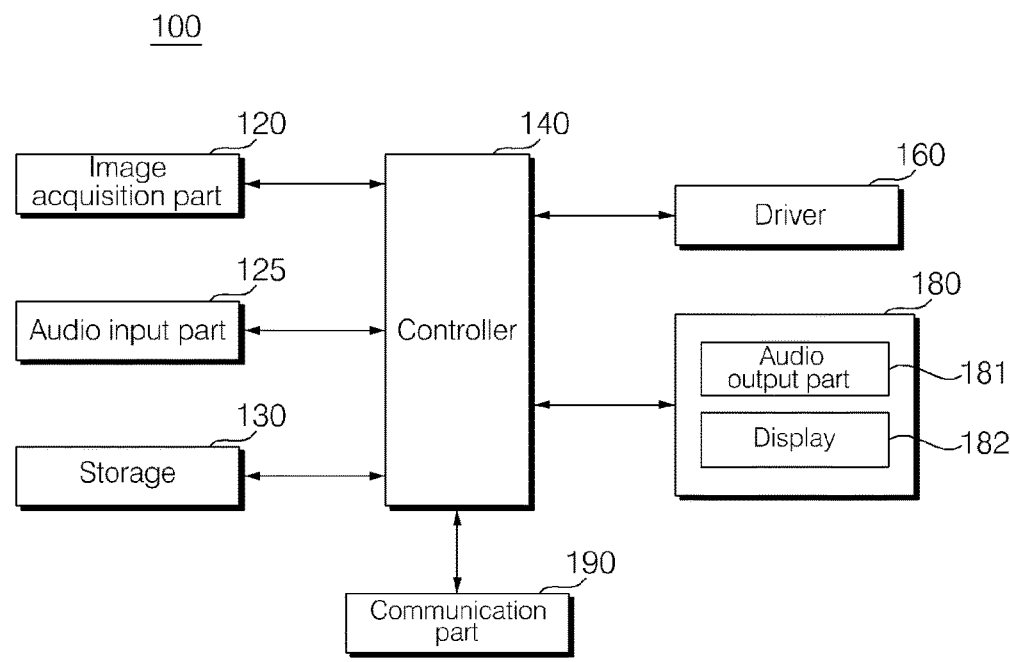
[FIG. 4]
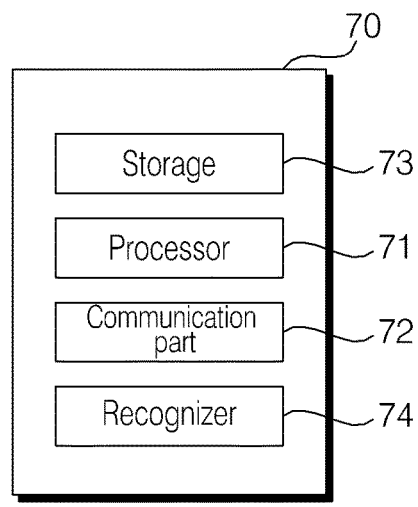

[FIG. 5]
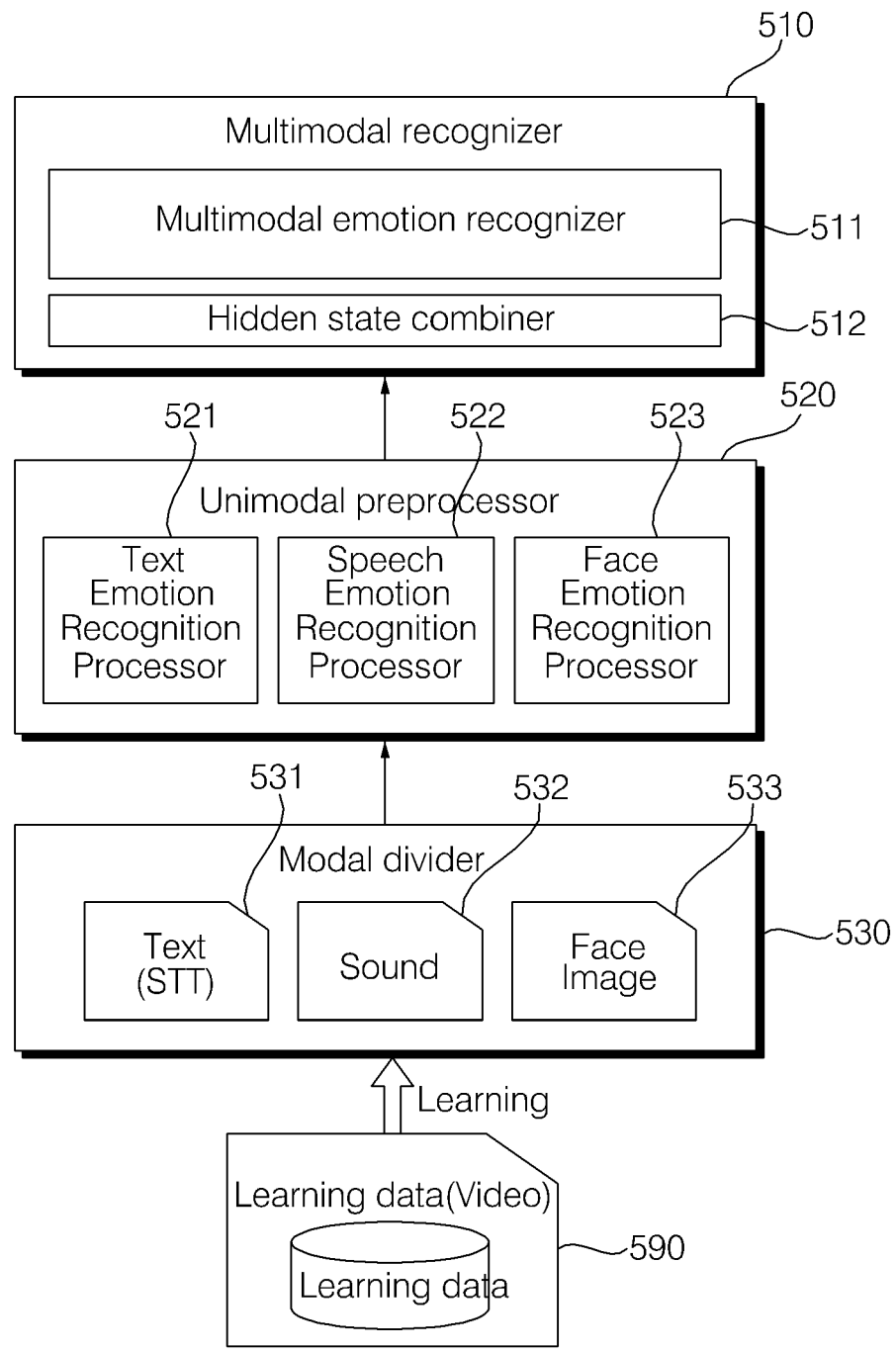

[FIG. 6]
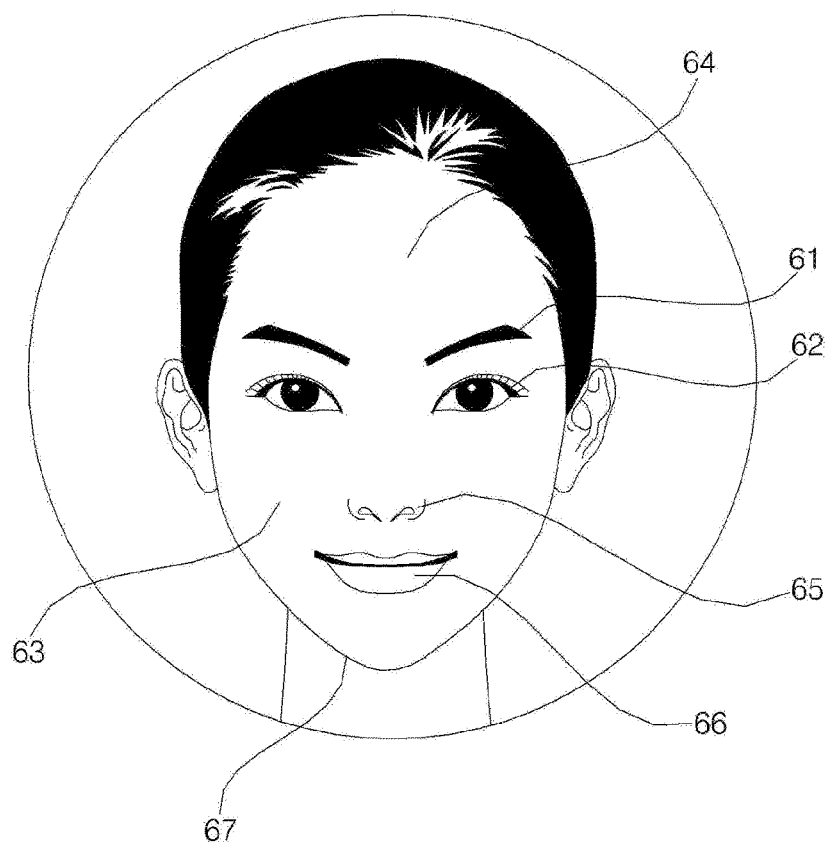
[FIG. 7]
| Emotion recognition (7 types) | Happiness | Surprise | Displeasure | Anger | Fear | Sadness | Neutrality |
|---|---|---|---|---|---|---|---|
| Default expression | ☺ | 😐 | 😮 | 😠 | 😨 | ☹ | ☺ |

[FIG. 8]
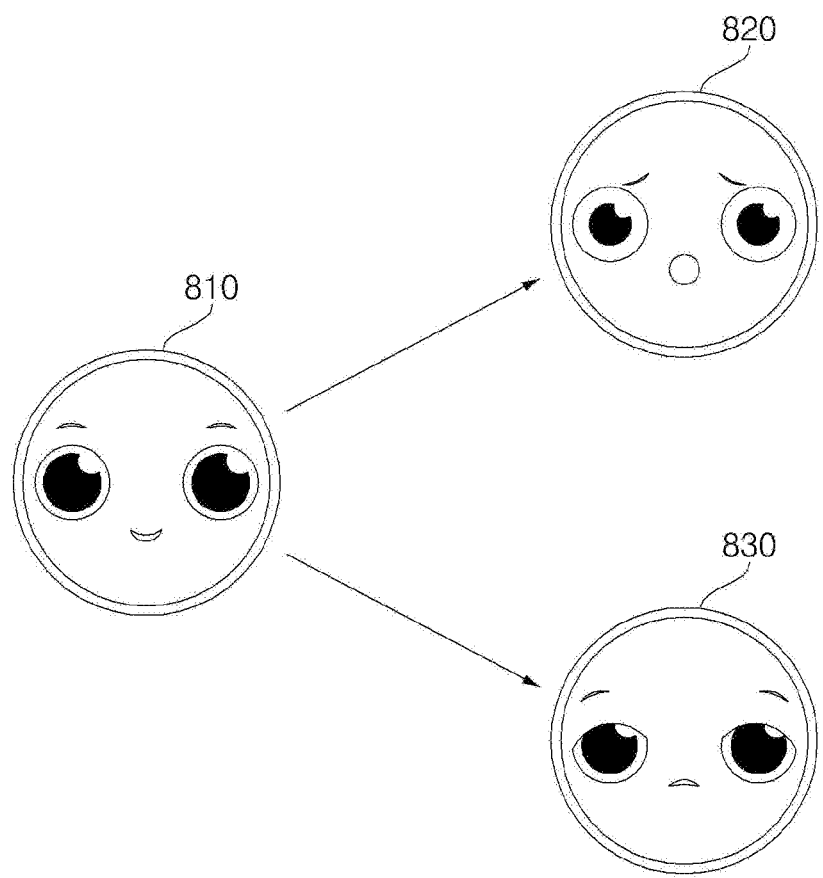

[FIG. 9(a)]
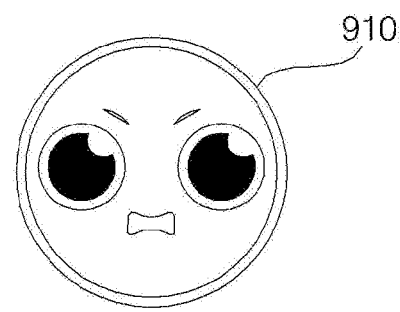
[FIG. 9(b)]
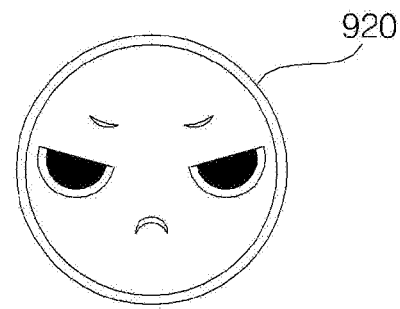

[FIG. 10(a)]
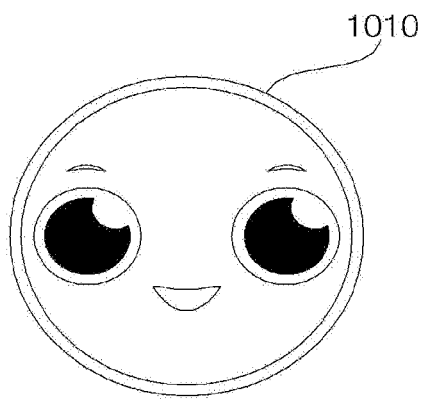
[FIG. 10(b)]
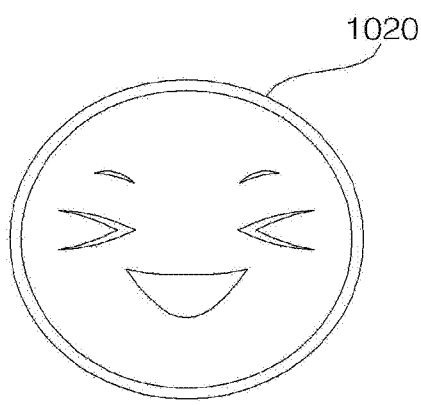
[FIG. 10(c)]
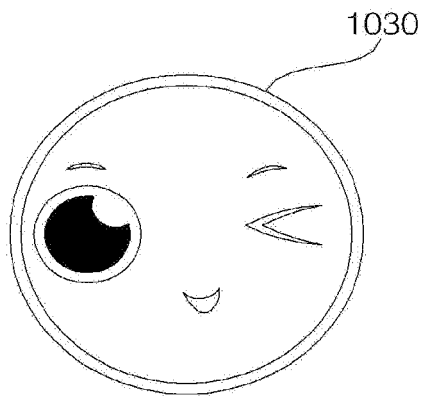

[FIG. 11]
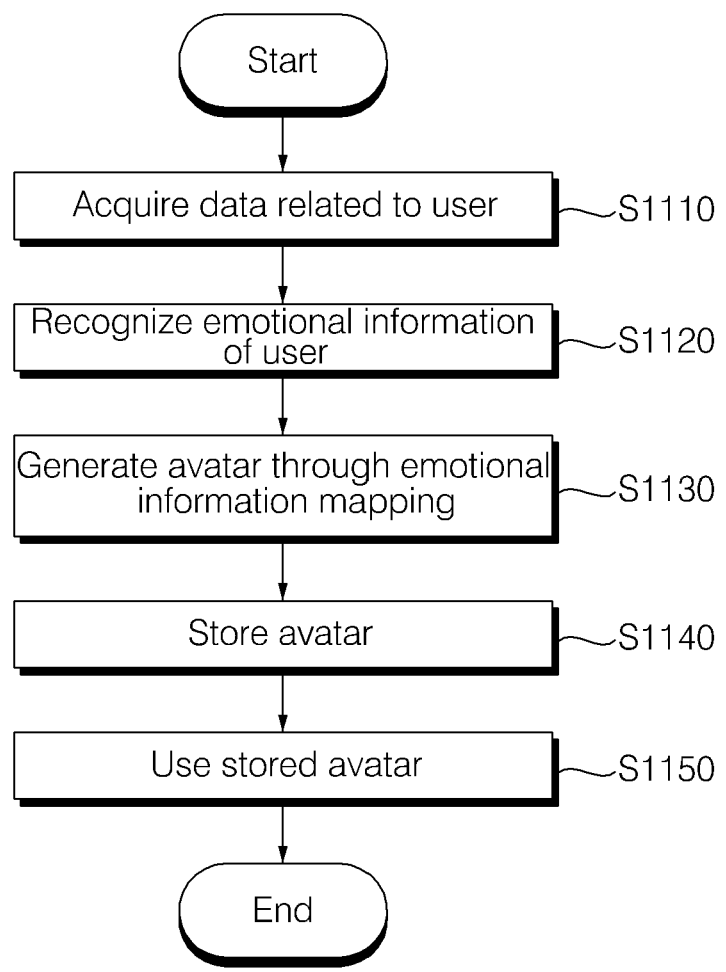

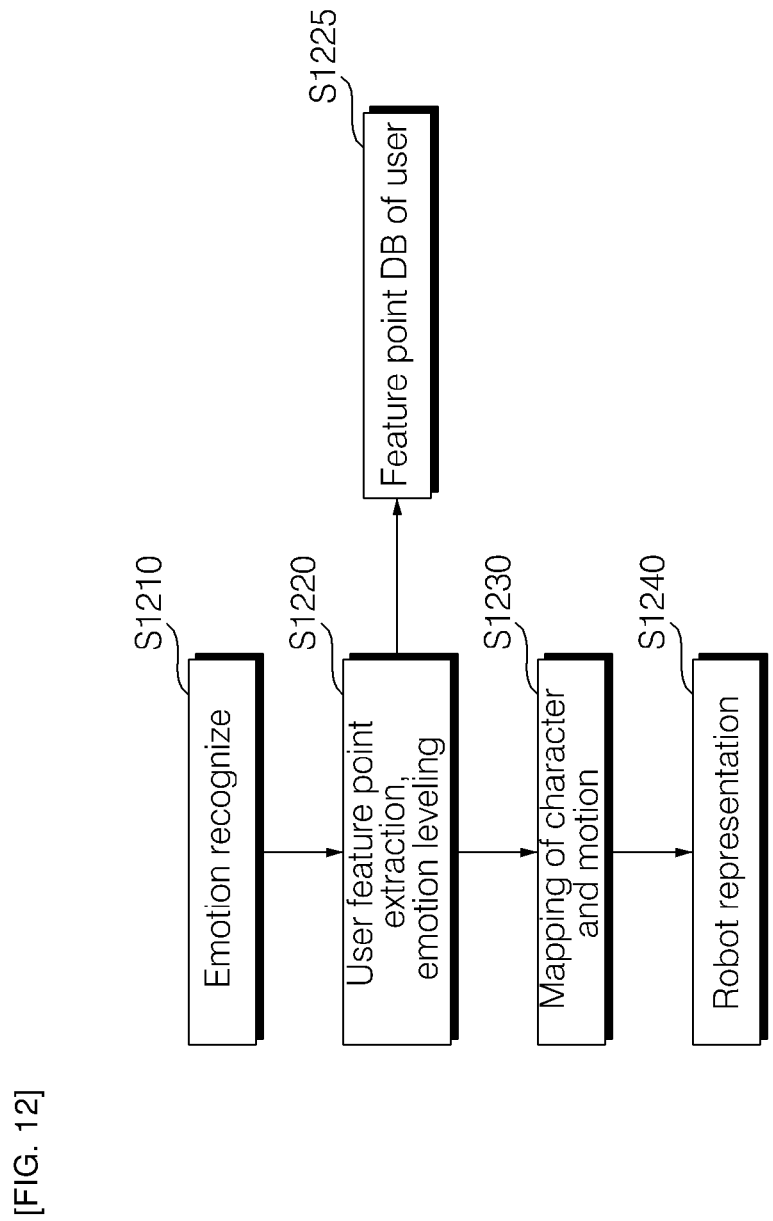
[FIG. 12]

[FIG. 13]
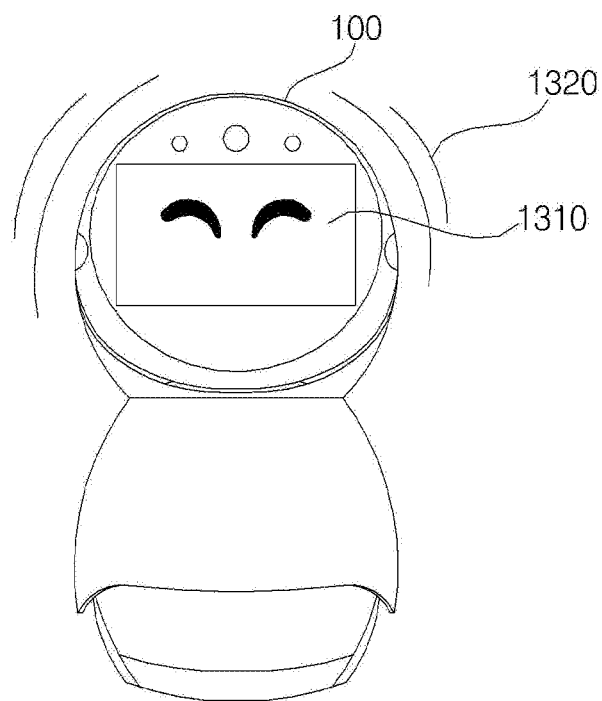

[FIG. 14]
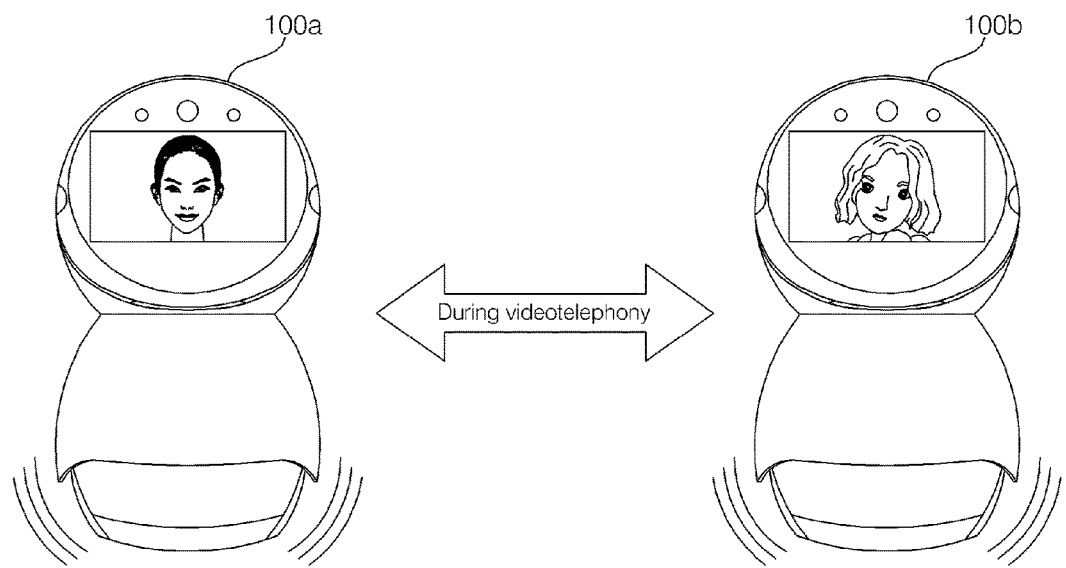
[FIG. 15]
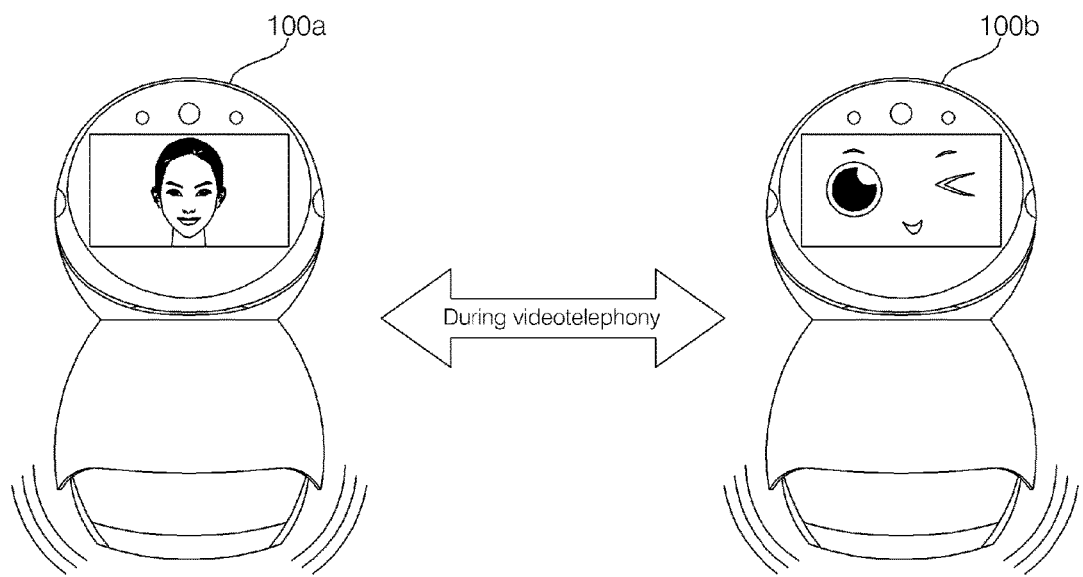

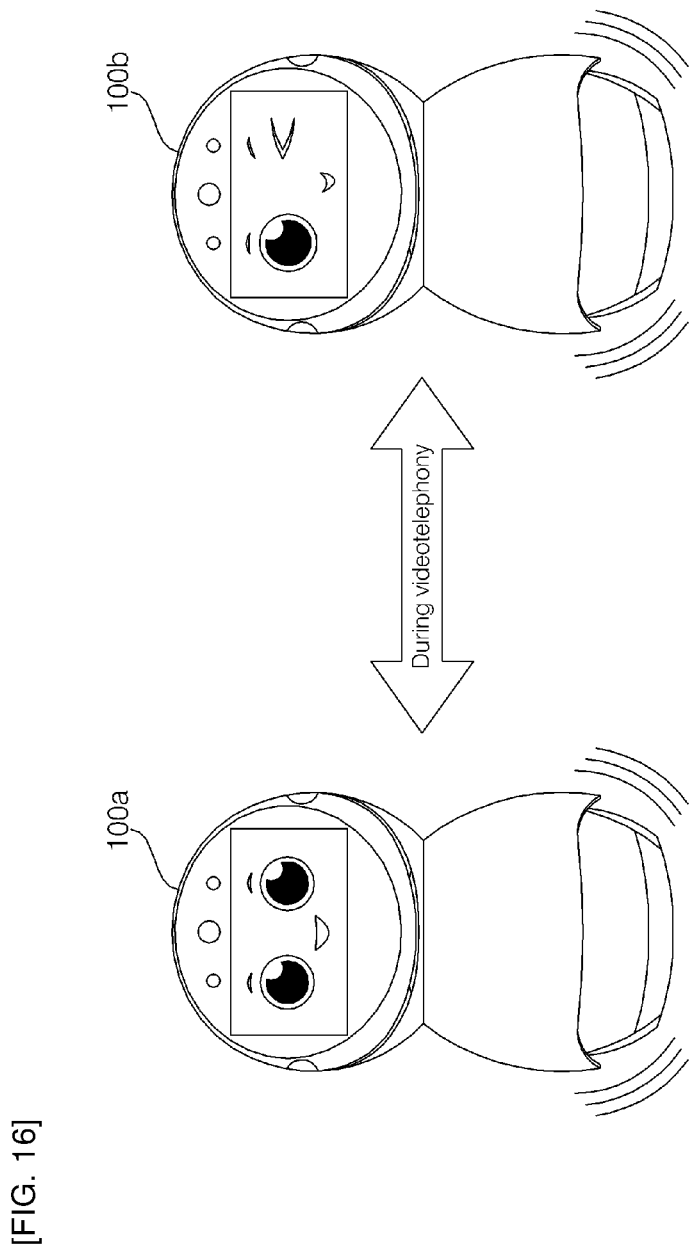
[FIG. 16]

[FIG. 17]
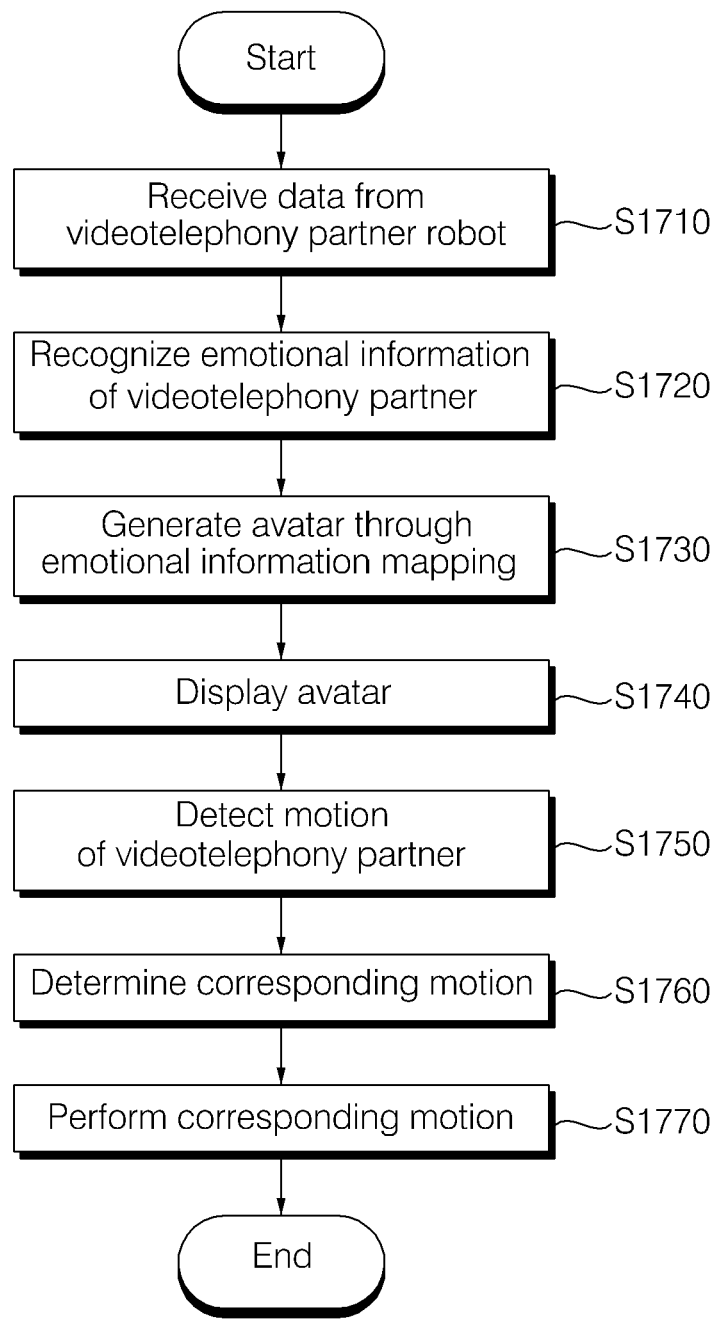

[FIG. 18]
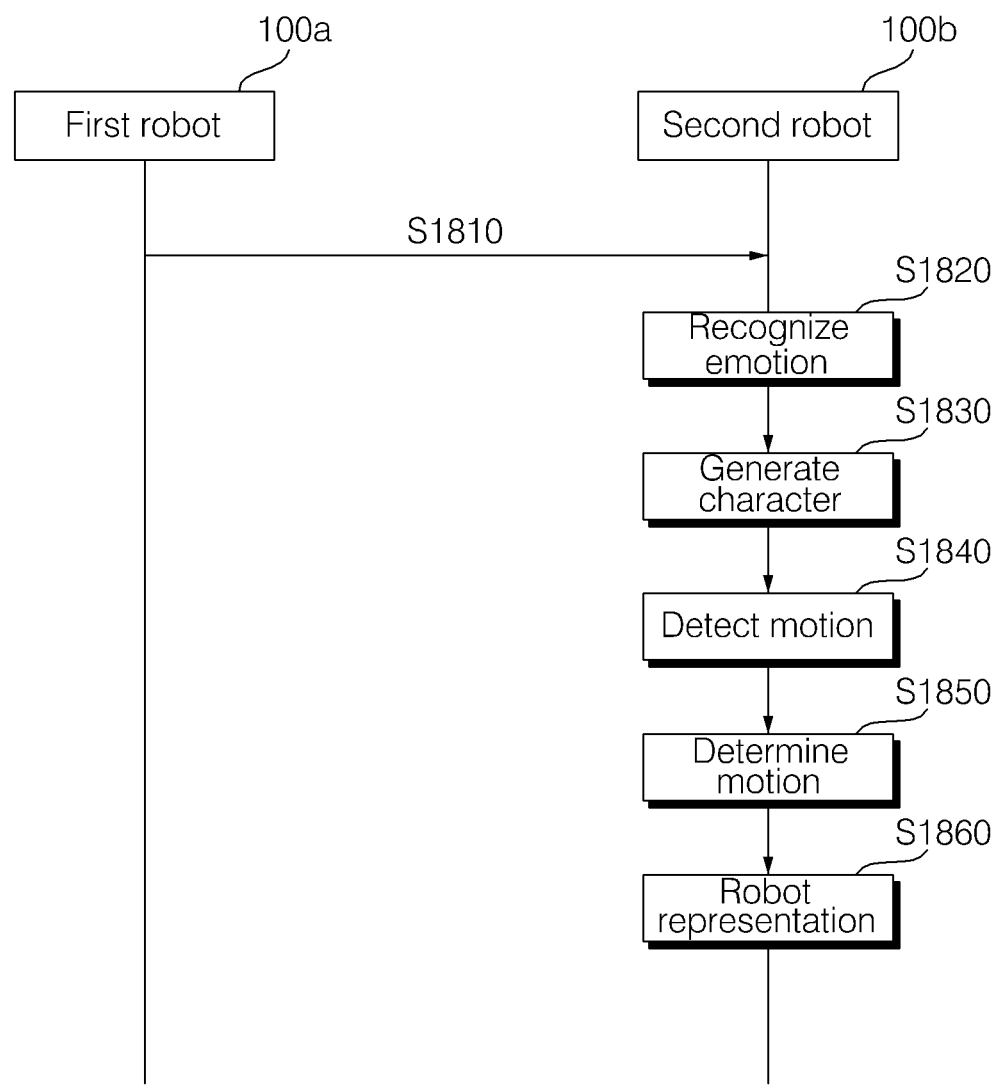

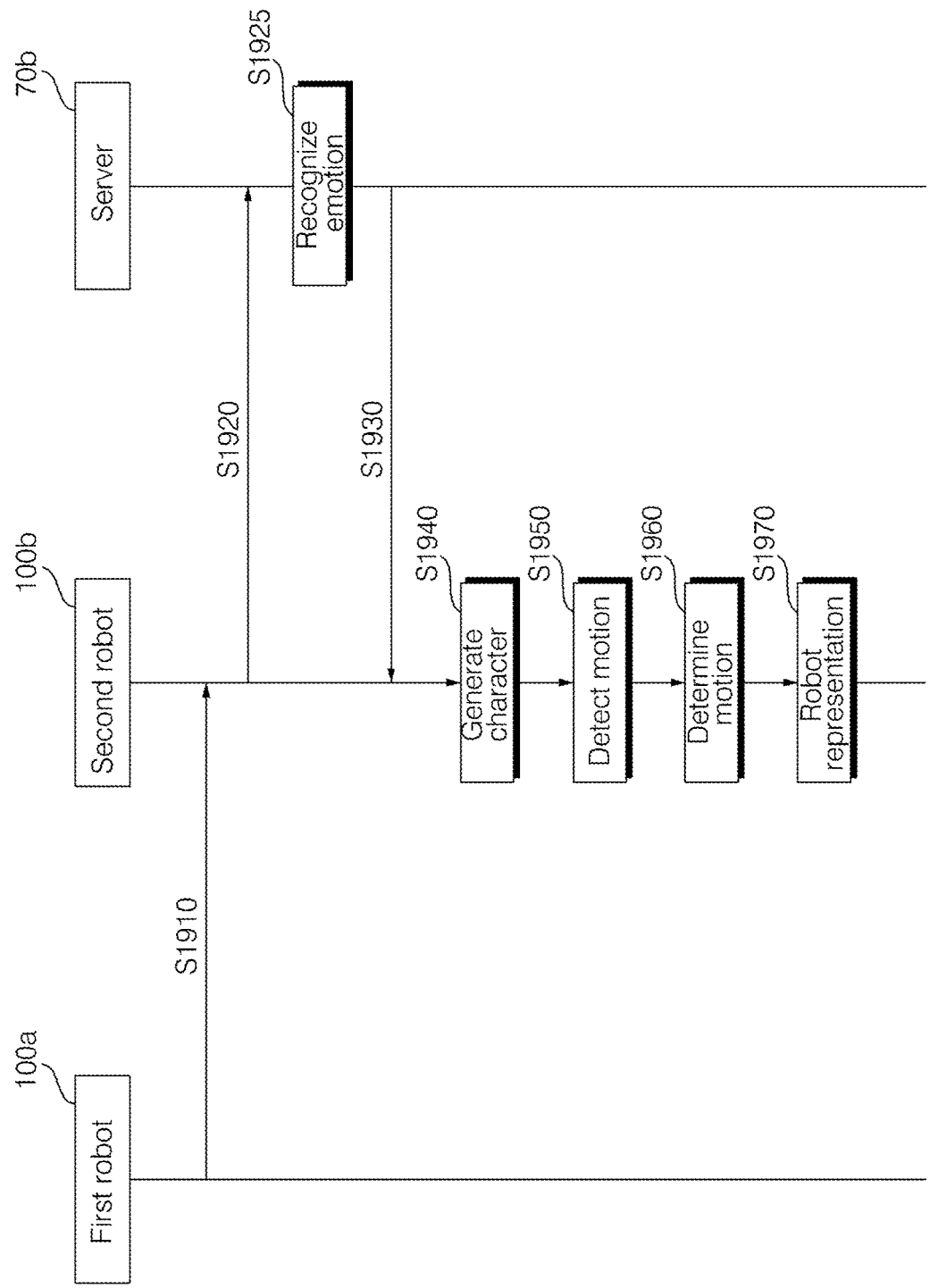

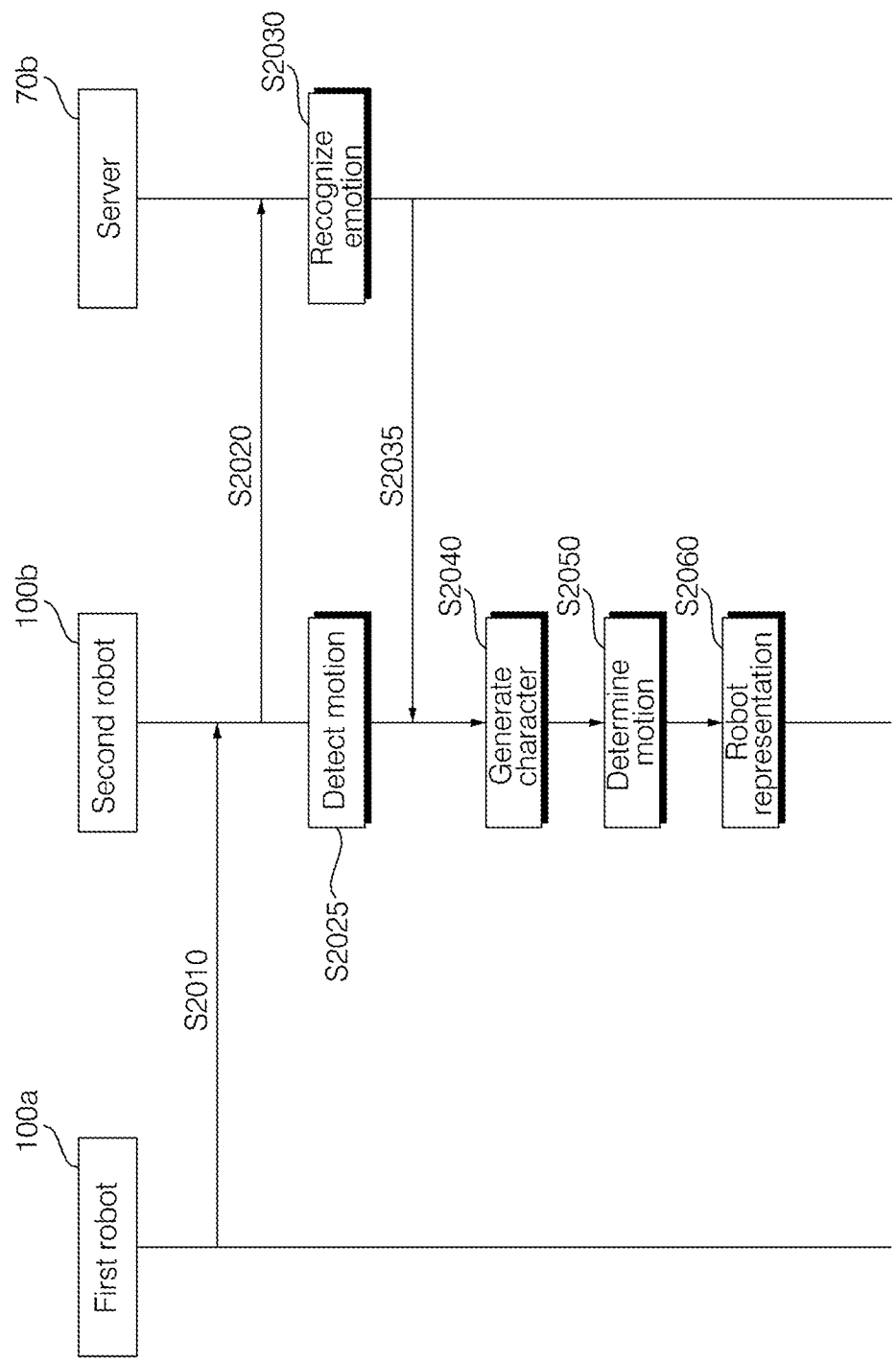

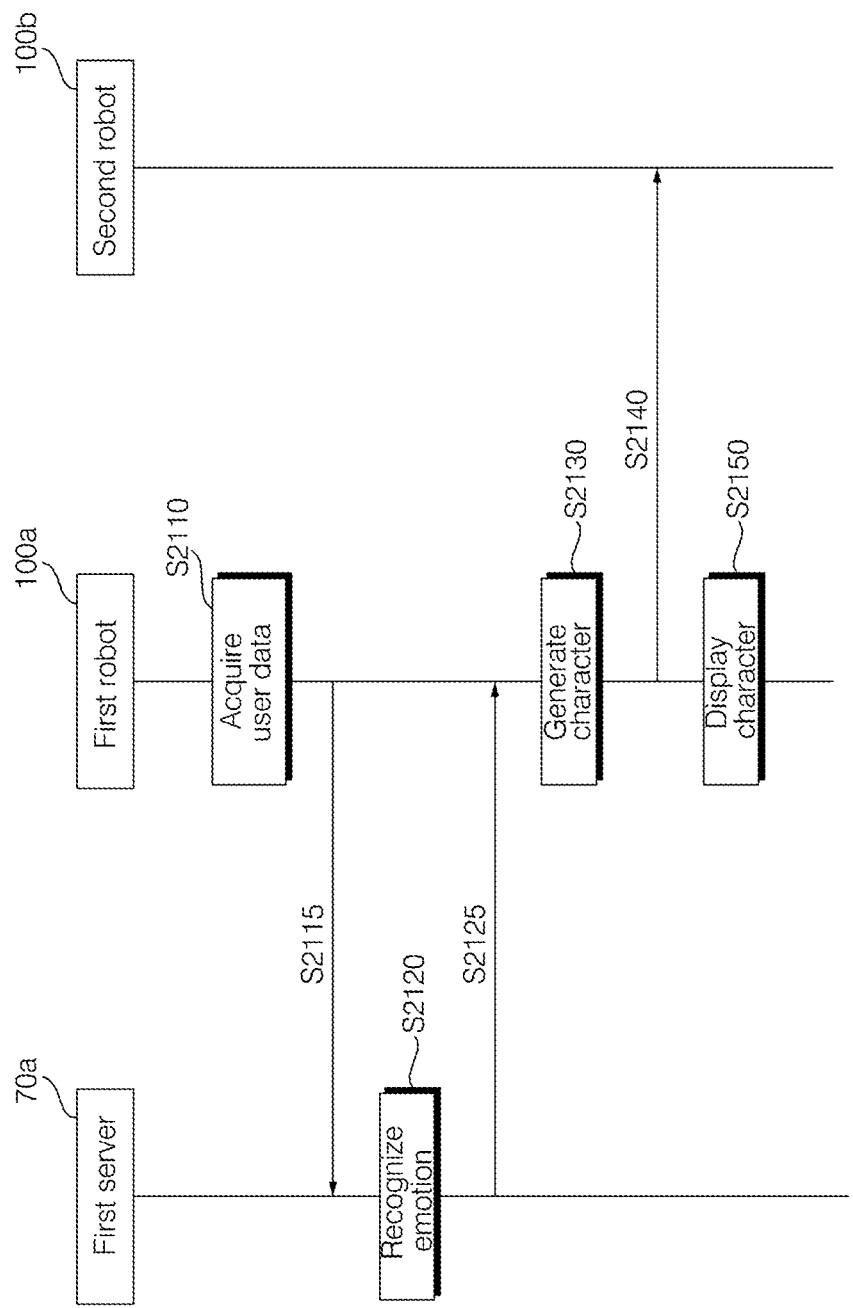

ROBOT AND METHOD FOR OPERATING SAME

CROSS-REFERENCE TO RELATED PATENT APPLICATIONS

This application is a U.S. National Stage Application under 35 U.S.C. § 371 of PCT Application No. PCT/KR2019/006614, filed May 31, 2019, which claims priority to Korean Patent Application No. 10-2018-0110501, filed Sep. 14, 2018, whose entire disclosures are hereby incorporated by reference.

TECHNICAL FIELD

The present disclosure relates to a robot and a method for operating the same, and other particular implementation relates to a robot and a method for operating the same which can recognize a user's emotion and provide emotion based services.

BACKGROUND ART

Robots have been developed for industrial purposes and served as a part of factory automation. With recent extension of applications using robots, medical robots, aerospace robots and the like have been developed and home robots that can be used in many households are also manufactured.

As robots are increasingly used, demand for robots capable of providing various types of information, fun and services while understanding and interacting with users beyond executing simple functions is increasing.

Recently, interesting and unique emoticons and characters are increasingly used in social network services, text messages, videotelephony, and the like. Furthermore, people create their unique emoticons and avatars in addition to simply using existing characters.

For example, users may generate and use unique characters using their faces. Patent literature 1 (US 2018/089880A1) discloses a technique of identifying face characteristics of an imaged user, generating avatar data corresponding to the identified characteristics and transmitting the avatar data.

In addition, Patent Literature 2 (US 2015/381534A1) discloses a technique of selecting a self-portrait capable of representing a user's emotion from a self-portrait set and transmitting the selected self-portrait as a file when sending an e-mail.

However, in the aforementioned patent literature, emoticons or characters to be transmitted by a user are replaced by unique characters (avatars or self-portraits) and thus there is a limit in extension of applications.

Furthermore, in such patent literature, a specific file selected depending on the intention of a user is transmitted, which is different from perception of a real emotion of the user and characters cannot be used for other services based on a user's emotion.

DISCLOSURE

Technical Problem

An object of the present disclosure is to provide a robot and a method for operating the same which can recognize a user's emotion and provide emotion based services.

An object of the present disclosure is to provide a robot and a method for operating the same which can automatically generate and use a character representing a user's emotion.

An object of the present disclosure is to provide an emotion recognition method which can recognize a user's emotion more accurately using an artificial intelligence trained through deep learning.

An object of the present disclosure is to provide a robot and a method for operating the same which can generate a user-specific emotional character by reflecting an emotion recognition result in the face of a user.

An object of the present disclosure is to provide a robot and a method for operating the same which can express emotions using generated emotional characters.

An object of the present disclosure is to provide a robot and a method for operating the same which can recognize an emotion of at least one of videotelephony participants and generate a character depending on the recognized emotion.

An object of the present disclosure is to provide a robot and a method for operating the same which can convey an emotion of the other party of videotelephony.

An object of the present disclosure is to provide a robot and a method for operating the same by which various types of enjoyment can be expected during videotelephony.

An object of the present disclosure is to provide a robot capable of recognizing a motion of at least one of videotelephony participants and acting in accordance with the recognized motion, and a method for operating the same.

Technical Solution

To accomplish the above and other objectives, according to one aspect of the present disclosure, a method for operating a robot including an image acquisition part provided on the front side of the main body of the robot and including a camera for acquiring an image of a user, an audio input part for receiving audio input of the user, a display for displaying a predetermined image, and an audio output part for outputting predetermined audio may provide emotion based services by acquiring data related to the user including image data including the face of the user and audio data uttered by the user and recognizing emotional information of the user on the basis of the acquired data related to the user.

To accomplish the above and other objectives, in the robot and the method for operating the same according to one aspect of the present disclosure, emotional information may be recognized on the basis of the image data including the face of the user and the audio data uttered by the user.

To accomplish the above and other objectives, in the robot and the method for operating the same according to one aspect of the present disclosure, an avatar expressing emotions of the user can be automatically generated by mapping recognized emotional information of the user to face information of the user.

The data related to the user may be video data in which the user has been photographed or real-time video data in which the user is photographed, and a character may be generated using stored data or data input in real time.

Further, since the data related to the user may include image data including the face of the user and audio data uttered by the user, the face of the user may be used to generate a character and various elements included in the image data and the audio data may be used to recognize emotions of the user.

To accomplish the above and other objectives, in the robot and the method for operating the same according to one aspect of the present disclosure, one of stored avatars of the user may be displayed and a generated avatar may be used as a default screen or a screen displayed in a specific situation, and thus a character can be used for facial expression and emotional expression of a robot.

To accomplish the above and other objectives, in the robot and the method for operating the same according to one aspect of the present disclosure, generated avatars may be stored in association with information on the user and corresponding avatars may be used for respective user later.

To accomplish the above and other objectives, in the robot and the method for operating the same according to one aspect of the present disclosure, when predetermined data is transmitted to other devices, an avatar or recognized emotional information may be transmitted along with the predetermined data to transmit emotions.

To accomplish the above and other objectives, in the robot and the method for operating the same according to one aspect of the present disclosure, a video of an avatar may be generated by mapping emotional information of the user to image data of the user and synchronizing audio data of the user therewith.

To accomplish the above and other objectives, in the robot and the method for operating the same according to one aspect of the present disclosure, an avatar may be generated by changing expression landmark points of a preset animated character such that they correspond to recognized emotional information.

To accomplish the above and other objectives, in the robot and the method for operating the same according to one aspect of the present disclosure, a degree of change in expression landmark points of an avatar may be controlled in response to the recognized emotional information of the user. According to settings, it is possible to augment an emotional expression by controlling the expression landmark points of the avatar to change greatly or mitigate the emotional expression by controlling the expression landmark points to change slightly.

To accomplish the above and other objectives, in the robot and the method for operating the same according to one aspect of the present disclosure, one of stored avatars of the user may be displayed and used for videotelephony.

To accomplish the above and other objectives, in the robot and the method for operating the same according to one aspect of the present disclosure, an avatar may be generated by changing expression landmark points of an animated character generated on the basis of the face information of the user such that the expression landmark points correspond to the recognized emotional information.

Further, in the robot and the method for operating the same according to one aspect of the present disclosure, an avatar may be generated by combining an expression landmark point image generated in response to the recognized emotional information with a face image of the user through augmented reality.

To accomplish the above and other objectives, in the robot and the method for operating the same according to one aspect of the present disclosure, motion of the user may be detected and corresponding motion obtained by mapping emotional information of the user to the detected motion may be performed.

To accomplish the above and other objectives, in the robot and the method for operating the same according to one aspect of the present disclosure, the recognized emotional information may be one of a plurality of emotional classes or a probability value for each emotional class.

To accomplish the above and other objectives, in the robot and the method for operating the same according to one aspect of the present disclosure, emotion recognition may be performed by the robot or an emotion recognition server.

Here, an emotion recognizer included in the robot or the server may be trained to recognize emotional information using a plurality of unimodal inputs and a multimodal input based on the plurality of unimodal inputs and output a composite emotion recognition result including emotion recognition results for the plurality of unimodal inputs and an emotion recognition result for the multimodal input, thereby recognizing emotions of the user more accurately.

To accomplish the above and other objectives, a robot according to one aspect of the present disclosure may include: an image acquisition part including a camera for acquiring image data including the face of a user; an audio input part for acquiring audio data uttered by the user; a display for displaying a predetermined image; an audio output part for outputting predetermined audio; an emotion recognizer for recognizing emotional information of the user on the basis of the image data including the face of the user and the audio data uttered by the user; and a controller for generating an avatar by mapping the recognized emotional information of the user to face information of the user.

To accomplish the above and other objectives, a robot according to one aspect of the present disclosure may include: an image acquisition part including a camera for acquiring image data including the face of a user; an audio input part for acquiring audio data uttered by the user; a display for displaying a predetermined image; an audio output part for outputting predetermined audio; a communication part for transmitting the image data including the face of the user and the audio data uttered by the user to a server and receiving an emotion recognition result from the server; and a controller for generating an avatar by mapping the recognized emotional information of the user to face information of the user.

Advantageous Effects

According to at least one of embodiments of the present disclosure, it is possible to recognize a user's emotion and provide emotion based services.

According to at least one of embodiments of the present disclosure, it is possible to recognize a user's emotion more accurately using an artificial intelligence trained through deep learning.

According to at least one of embodiments of the present disclosure, it is possible to automatically generate and use a character representing a user's emotion to provide fun and use convenience to the user.

According to at least one of embodiments of the present disclosure, it is possible to add emotional factors to communication between a user and a robot and communication between users using characters representing user's emotions.

According to at least one of embodiments of the present disclosure, it is possible to recognize an emotion of at least one of videotelephony participants and generate a character depending on the recognized emotion to intuitively check the emotion of the videotelephony participant.

According to at least one of embodiments of the present disclosure, it is possible to convey an emotion of the other part of videotelephony to improve user satisfaction and convenience.

According to at least one of embodiments of the present disclosure, a robot can recognize a motion of the other party of videotelephony and perform an operation corresponding to the recognized motion such that users can use videotelephony more interestingly and conveniently.

Various other effects will be directly or suggestively disclosed in the following detailed description of embodiments of the present disclosure.

DESCRIPTION OF DRAWINGS

FIG. 1 is a diagram showing a configuration of a robot system including a robot according to an embodiment of the present disclosure.

FIG. 2 is a front view showing the exterior of the robot according to an embodiment of the present disclosure.

FIG. 3 is an exemplary internal block diagram of the robot according to an embodiment of the present disclosure.

FIG. 4 is an exemplary internal block diagram of a server according to an embodiment of the present disclosure.

FIG. 5 is an exemplary internal block diagram of an emotion recognizer according to an embodiment of the present disclosure.

FIG. 6 is a diagram referred to in description of emotion recognition according to an embodiment of the present disclosure.

FIGS. 7 to 10(c) are diagrams referred to in description of expression of characters according to an embodiment of the present disclosure.

FIG. 11 is a flowchart showing a method for operating a robot according to an embodiment of the present disclosure.

FIG. 12 is a flowchart showing a method for operating a robot according to an embodiment of the present disclosure.

FIG. 13 is a diagram referred to in description of emotion expression of the robot according to an embodiment of the present disclosure.

FIGS. 14 to 16 are diagrams referred to in description of videotelephony using the robot according to an embodiment of the present disclosure.

FIG. 17 is a flowchart showing a method for operating a robot according to an embodiment of the present disclosure.

FIGS. 18 to 21 are flowcharts showing method for operating robot systems according to an embodiment of the present disclosure.

BEST MODEL

Hereinafter, embodiments of the disclosure will be described in detail with reference to the attached drawings. However, the disclosure is not limited to these embodiments and can be modified in various forms.

Illustration of parts irrelevant to description is omitted in the figures to clarify the disclosure, and the same or similar components are given the same reference numbers throughout the specification.

The suffixes "module" and "unit" of elements used in the following description are used for convenience of description and thus can be used interchangeably and do not have any distinguishable meanings or functions.

While terms, such as "first", "second", etc., may be used to describe various components, such components must not be limited by the above terms. The above terms are used only to distinguish one component from another.

FIG. 1 is a diagram showing a configuration of a robot system including a robot according to an embodiment of the present disclosure.

Referring to FIG. 1, the robot system according to an embodiment of the present disclosure may include one or more robots 100 and a home appliance 10 which can communicate with other devices, the robot 100, a server 70 and the like or access networks through a communication module included therein.

For example, the home appliance 10 may include an air conditioner, a robot cleaner 12, a refrigerator 13, a washing machine, cooking equipment, and the like which include communication modules.

The home appliance 10 may include a Wi-Fi communication module, but the present disclosure is not limited to communication methods.

The home appliance 10 may include another type of communication module or include a plurality of communication modules. For example, the home appliance 10 may include an NFC module, a Zigbee communication module, a Bluetooth™ communication module, and the like.

The home appliance 10 is connectable to a predetermined server 70 through a Wi-Fi communication module or the like and can support smart functions such as remote monitoring and remote control.

The robot system according to an embodiment of the present disclosure may include a mobile terminal (not shown) such as a smartphone and a tablet PC.

A user can check information about the home appliance 10 in the robot system or control the home appliance 10 through the mobile terminal.

Meanwhile, it may be inconvenient for the user to control the home appliance 10 or check predetermined information using the mobile terminal at home.

For example, when the user does not know the current position of the mobile terminal or the mobile terminal is placed in other places, it is more efficient to control the home appliance 10 using other means.

The robot 100 according to an embodiment of the present disclosure can receive audio input of a user and control the home appliance 10 directly or via the server 70 in response to the audio input.

Accordingly, the user can control the home appliance 10 without operating other devices placed in rooms, a living room and the like other than the robot 100.

The robot system according to an embodiment of the present disclosure may include a plurality of IoT (Internet of Things) devices (not shown).

Accordingly, the robot system can include the home appliance 10, the robot 100, and IoT devices.

The robot system according to an embodiment of the present disclosure is not limited to communication schemes constituting networks.

For example, the home appliance 10, the robot 100 and the IoT devices can be connected for communication through a wired/wireless router (not shown).

In addition, devices in the robot system can constitute a mesh topology through which devices are individually connected for communication.

The home appliance 10 in the robot system can communicate with the server 70 or the robot 100 through the wired/wireless router (not shown).

Further, the home appliance 10 in the robot system can communicate with the server 70 or the robot 100 through Ethernet.

The robot system according to an embodiment of the present disclosure may further include a network device such as a gateway. At least one robot 100 in a home may be configured to include the aforementioned gateway function.

The home appliance 10 included in the robot system can be connected to a network directly or through the gateway.

Further, the home appliance 10 can be connected to a network such that it can communicate with the server 70 directly or via the gateway.

The gateway can communicate with the server 70 or a mobile terminal through Ethernet.

In addition, the gateway can communicate with the server 70 of the robot 100 through a wired/wireless router.

The home appliance 10 can transmit device operation state information, set value information and the like to the server 70 and/or the gateway.

A user can check information about the home appliance 10 in the robot system or control the home appliance 10 through the robot 100.

The server 70 and/or the gateway can transmit a signal for controlling the home appliance 10 to the home appliance 10 in response to a user command input through the robot 100 or a specific event generated in the home appliance 10 in the robot system.

The gateway may include an output means such as a display and an audio output part according to an embodiment.

In this case, the display and the audio output part can output images and audio stored in the gateway or based on received signals. For example, a music file stored in the gateway can be reproduced and output through the audio output part.

Further, the display and the audio output part can output images and audio information related to operation of the gateway.

The server 70 can store and manage information transmitted from the home appliance 10, the robot 100 and other devices.

The server 70 may be a server operated by a home appliance manufacturer or a company providing services as a proxy of the manufacturer.

Information about the home appliance 10 can be transmitted to the robot 100 and the robot 100 can display the information about the home appliance 10.

The home appliance 10 can receive information or commands from the robot 100. Here, the home appliance 10 can transmit various types of information to the server 70 and the server 70 can transmit some or all information received from the home appliance 10 to the robot 100.

In addition, the server 70 can transmit information received from the home appliance 10 to the robot 100 or process the information and then transmit the processed information to the robot 100.

Although FIG. 1 illustrates a case in which there is a single server 70, the present disclosure is not limited thereto and the system according to the present disclosure can operate in connection with two or more servers.

For example, the server 70 can include a first server for speech recognition and processing and a second server for providing home appliance related services such as home appliance control.

According to embodiments, the first server and the second server may be configured as a plurality of servers such that information and functions are distributed or configured as a single integrated server.

For example, the first server for speech recognition and processing can be composed of a speech recognition server which recognizes words included in an audio signal and a natural language processing server which recognizes the meaning of a sentence including words included in an audio signal.

Alternatively, the server 70 may include a server for emotion recognition and processing and a server for providing home appliance related services such as home appliance control. In this case, the server for emotion recognition and processing may be configured as a plurality of servers such that information and functions are distributed or configured as a single integrated server.

FIG. 2 is a front view showing the exterior of the robot according to an embodiment of the present disclosure and FIG. 3 is an exemplary internal block diagram of the robot according to an embodiment of the present disclosure.

Referring to FIGS. 2 and 3, the robot 100 includes a main body 101 and 102 forming the exterior and storing various components therein.

The main body 101 and 102 may include a body 101 forming a space in which various components constituting the robot 100 are stored and a support 102 disposed under the body 101 to support the body 101.

Further, the robot 100 may include a head 110 disposed on the main body 101 and 102. A display 182 capable of displaying images may be disposed on the front surface of the head 110.

In the specification, a forward-and-backward direction may refer to a +y-axis direction, a vertical direction may refer to a z-axis direction, and a horizontal direction may refer to an x-axis direction.

The head 110 can rotate within a predetermined angle range on the basis of the x axis.

Accordingly, the head 100 can perform a nodding action of moving in the vertical direction like nodding of a person when viewed from the front. For example, the head 110 can perform an operation of rotating within a predetermined range and then returning to the original position like nodding of a person at least once.

According to an embodiment, the head 100 may be implemented such that at least a part of the front surface on which the display 182 is disposed which can correspond to the face of a user is nodded.

Accordingly, although an embodiment in which the entire head 110 moves in the vertical direction is described in this specification, a nodding action of the head 110 in the vertical direction may be replaced by a nodding action of a part of the front surface of the head 110 on which the display 182 is disposed in the vertical direction unless otherwise mentioned.

The body 101 can be configured to be rotatable in the horizontal direction. That is, the body 101 can be configured such that it can rotate 360 degrees on the basis of the z axis.

In addition, the body 101 may move as if it nods by being configured such that it can rotate within a predetermined angle range on the basis of the z axis. In this case, the head 110 can also rotate on the basis of the rotating axis of the body 101 as the body 101 rotates in the vertical direction.

Accordingly, a nodding action of the head 110 in the vertical direction can include both a case in which the head 110 rotates in the vertical direction on the basis of a predetermined axis when viewed from the front and a case in which the head 110 connected to the body 101 rotates and nods along with nodding of the body 101 in the vertical direction in this specification.

Meanwhile, the robot 100 can include a power supply (not shown) which is connected to an electrical outlet in a home and supplies power to the robot 100.

Alternatively, the robot 100 may include a power supply (not shown) which includes a rechargeable battery (not shown) and supplies power to the robot 100. According to an embodiment, the power supply (not shown) may include a wireless power receiver for wirelessly charging the battery.

The robot 100 can include an image acquisition part 120 capable of photographing surroundings of the main body 101 and 102 within a predetermined range on the basis of the front side of the main body 101 and 102.

The image acquisition part 120 photographs surroundings of the main body 101 and 102 and external environments and may include a camera module. The camera module may include a digital camera. The digital camera may include at least one optical lens, an image sensor (e.g., a CMOS image sensor) composed of a plurality of photodiodes (e.g., pixels) which forms an image by light that has passed through the optical lens, and a digital signal processor (DSP) which generates an image on the basis of signals output from the photodiodes. The digital signal processor can generate not only a still image but also a video composed of frames configured as still images.

A plurality of cameras may be provided to a plurality of portions of the robot 100 for photographing efficiency. The image acquisition part 120 preferably includes a front camera provided on the front surface of the head 110 to acquire a front view image of the main body 101 and 102. However, the number, arrangement, type and photographing range of cameras included in the image acquisition part 120 are not limited to the aforementioned ones.

The image acquisition part 120 may capture a front view image of the robot 100 or an image for user recognition.

An image captured by the image acquisition part 120 may be stored in a storage 130.

Further, the robot 100 may include an audio input part 125 for receiving audio input of a user.

The audio input part 125 may include a processor for converting analog audio into digital data or may be connected to the processor to convert a user input audio signal into data such that the user input audio signal can be recognized by the server 70 or a controller 140.

The audio input part 125 may include a plurality of microphones in order to improve the accuracy of user audio input reception and identify a position of a user.

For example, the audio input part 125 may include at least two microphones.

A plurality of microphones MIC may be separately disposed at different positions and may acquire external audio signals including speech signals and process the acquired signals into electrical signals.

At least two microphones as input devices are required to estimate a sound source generating sound and a direction of a user, and direction detection resolution (angle) increases as a distance between microphones increases.

According to an embodiment, two microphones can be provided in the head 110.

Further, two microphones may be further provided on the rear side of the head 110 to identify a user position in a three-dimensional space.

Referring to FIG. 3, the robot 100 may include the controller 140 which controls overall operation, the storage 130 which store various types of data, and a communication part 190 which transmits/receives data to/from other devices such as the server 70.

In addition, the robot 100 may further include a driver 160 which rotates the head 110 and the body 101. The driver 160 may include a plurality of driving motors (not shown) for rotating and/or moving the body 101 and the head 110.

The controller 140 controls overall operation of the robot 100 by controlling the image acquisition part 120, the driver 160 and the display 182 constituting the robot 100.

The storage 130 records various types of information necessary to control the robot 100 and may include a volatile or non-volatile recording medium. The recording medium stores data readable by a microprocessor and may include a hard disk drive (HDD), a solid state drive (SSD), a silicon disk drive (SDD), a ROM, a RAM, a CD-ROM, a magnetic tape, a floppy disk, an optical data storage device or the like.

Further, the controller 140 may transmit an operating state of the robot 100 or user input to the server 70 through the communication part 190.

The communication part 190 includes at least one communication module through which the robot 100 is connected to the Internet or a predetermined network.

In addition, the communication part 190 is connected to the communication module included in the home appliance 10 and processes data transmission and reception between the robot 100 and the home appliance 10.

Data for speech recognition may be stored in the storage 130 and the controller 140 can process an audio input signal of a user received through the audio input part 125 and perform a speech recognition process.

Since the speech recognition process can use various known speech recognition algorithms, detailed description of the speech recognition process is omitted in this specification.

The controller 140 can control the robot 100 such that the robot 100 performs a predetermined operation on the basis of a speech recognition result.

For example, when a command included in an audio signal is a command for controlling operation of a predetermined home appliance, the controller 140 can control a control signal based on the command included in the audio signal to be transmitted to the control target home appliance.

When a command included in an audio signal is a command for controlling operation of a predetermined home appliance, the controller 140 can control the body 101 of the robot such that the body 101 rotates toward the control target home appliance.

The speech recognition process may be performed in the server 70 instead of the robot 100.

In this case, the controller 140 can control the communication part 190 such that a user input audio signal is transmitted to the server 70.

Simple speech recognition may be performed by the robot 100 and highly difficult speech recognition such as natural language processing may be performed by the server 70.

For example, when keyword audio input including a preset keyword is received, the robot can be switched from a standby state to an operating state. In this case, the robot 100 can perform only a speech recognition process with respect to keyword audio input and the following speech recognition process with respect to user audio input can be performed through the server 70.

According to an embodiment, the controller 140 may compare an image of a user acquired through the image acquisition part 120 with information stored in advance in the storage 130 and determine whether the user matches a registered image.

Further, the controller 140 may control the robot such that the robot performs a specific operation only for audio input of a registered user.

The controller 140 can control the body 101 and/or the head 110 such that the body 101 and/or the head 110 rotate on the basis of user image information acquired through the image acquisition part 120.

Accordingly, interaction and communication between the user and the robot can be facilitated.

The robot 100 includes an output part 180 through which predetermined information can be displayed as an image or output as audio.

The output part 180 may include the display 182 which displays, as images, information corresponding to a command input by a user, a processing result corresponding to the command input from the user, an operation mode, an operating state, an error state, and the like.

The display 182 may be disposed on the front side of the head 110 as described above.

According to an embodiment, the display 182 may be configured as a touch screen having a touch pad in a layered structure. In this case, the display 182 may be used as an input device through which information can be input through touch of a user in addition to an output device.

Furthermore, the output part 180 may further include an audio output part 181 which outputs audio signals. The audio output part 181 can output, as audio, warning sounds, alarm messages representing an operation mode, an operating state, an error state and the like, information corresponding to user command input, processing results corresponding to user command input, and the like. The audio output part 181 can convert an electrical signal from the controller 140 into an audio signal and output the audio signal. To this end, the audio output part 181 may include a speaker.

Referring to FIG. 2, the audio output part 181 can be disposed on the left and right sides of the head 110 and output predetermined information as audio.

The exterior and structure of the robot illustrated in FIG. 2 are exemplary and the present disclosure is not limited thereto. For example, the positions and numbers of the audio input part 125, the image acquisition part 120 and the audio output part 181 may depend on design specifications. Further, a rotation direction and angle of each component may be varied. For example, the entire robot 100 may tilt or shake in a specific direction different from the rotation direction of the robot 200 illustrated in FIG. 2.

The robot 100 according to an embodiment of the present disclosure can be connected to the Internet or a computer according to support of a wired or wireless Internet function.

Further, the robot 100 according to an embodiment of the present disclosure can execute audio and videotelephony functions and such call functions can be executed using the Internet according to voice over Internet protocol (VoIP), a mobile communication network, or the like.

The controller 140 can control the display 182 such that the display 182 displays an image of the other party of videotelephony and an image of a user during videotelephony according to setting of the user and control the audio output part 181 such that the audio output part 181 outputs audio based on a received audio signal of the other party of videotelephony.

The robot system according to an embodiment of the present disclosure may include two or more robots which perform videotelephony.

FIG. 4 is an exemplary internal block diagram of a server according to an embodiment of the present disclosure.

Referring to FIG. 4, the server 70 may include a communication part 72, a storage 73, a recognizer 74 and a processor 71.

The processor 71 can control overall operation of the server 70.

The server 70 may be a server operated by a manufacturer of home appliances such as the robot 100 or a server operated by a service provider and may be a cloud server.

The communication part 72 can receive various types of data such as status information, operation information and manipulation information from mobile terminals, home appliances such as the robot 100, and gateways.

In addition, the communication part 72 can transmit data corresponding to received information to mobile terminals, home appliances such as the robot 100, and gateways.

To this end, the communication part 72 may include one or more communication modules such as an Internet module and a mobile communication module.

The storage 73 can store received information and include data for generating result information corresponding to received information.

Further, the storage 73 can store data used for machine learning, result data, and the like.

The recognizer 74 can serve as a learning device of home appliances such as the robot 100.

The recognizer 74 may include an artificial neural network, for example, a deep neural network (DNN) such as a convolutional neural network (CNN), a recurrent neural network (RNN), or a deep belief network (DBN) and learn a deep neural network.

The processor 71 can control an artificial neural network structure of a home appliance such as the robot 100 such that the artificial neural network structure is updated to a trained artificial neural network structure after learning according to settings.

The recognizer 74 can receive input data for recognition, recognize attributes of objects, spaces and emotions included in the input data and output a recognition result. In this case, the communication part 72 can transmit the recognition result to the robot 100.

Further, the recognizer 74 can analyze and learn data related to usage of the robot 100 to recognize usage patterns, usage environments and output recognition results. In this case, the communication part 72 can transmit the recognition results to the robot 100.

Accordingly, home appliance products such as the robot 100 can receive recognition results from the server 70 and operate using the received recognition results.

The server 70 can receive an audio input signal uttered by a user and perform speech recognition. To this end, the server 70 may include a speech recognizer and an artificial neural network trained to perform speech recognition using data input to the speech recognizer and output a speech recognition result.

The server 70 may include a speech recognition server for speech recognition. The speech recognition server may include a plurality of servers which divides a predetermined process in a speech recognition process and performs the divided processes. For example, the speech recognition server may include an automatic speech recognition (ASR) server which receives audio data and converts the received audio data into text data, and a natural language processing (NLP) server which receives the text data from the ASR server and analyzes the received text data to identify an audio command. The speech recognition server may further include a text-to-speech (TTS) server which converts a text-to-speech recognition result output from the NLP server into audio data and transmits the audio data to other servers or home appliances as necessary.

The server 70 can perform emotion recognition on input data. To this end, the server 70 may include an emotion recognizer and the emotion recognizer may include an artificial neural network trained to perform emotion recognition using input data and output an emotion recognition result.

The server 70 may include an emotion recognition server for emotion recognition. That is, at least one server 70 may be an emotion recognition server including an emotion recognizer for performing emotion recognition.

FIG. 5 is an exemplary internal block diagram of an emotion recognizer according to an embodiment of the present disclosure.

Referring to FIG. 5, an emotion recognizer 74a included in the robot 100 or the server 70 can perform deep learning using emotional data as input data 590.

The emotion recognizer 74a according to an embodiment of the present disclosure may include a unimodal preprocessor 520 including a plurality of modal recognizers 521, 522 and 523 trained to recognize emotional information of a user included in unimodal input data, and a multimodal recognizer 510 which combines output data of the plurality of modal recognizers 521, 522 and 523 and is trained to recognize emotional information of a user included in the combined data.

Emotional data is information about a user's emotional state and may include image, audio and bio-signal data corresponding to emotional information that can be used for emotion recognition. Preferably, the input data 590 may be video data including the face of a user. More preferably, the input data 590 may further include audio data including speech of a user.

An emotion is a feeling about a stimulus and the nature of mind that accepts a sensual stimulus or impression, and highly psychological experiences of the human with respect to environmental variation or external physical stimuli are defined as mixed emotions such as comfortableness and displeasure as in sensibility ergonomics.

In this specification, an emotion may refer to an emotion such as comfortableness or displeasure occurring against a stimulus, and an emotion may be recognized as one or N representative emotional states. The N representative emotional states can be referred to as emotional classes.

For example, the emotion recognizer 74a can recognize six representative emotional classes of "surprise", "happiness", "sadness", "displeasure", "anger" and "fear" and output one of the representative emotional classes or a probability value for each of the six representative emotional classes as an emotion recognition result.

A neutrality emotional class representing a default emotional state other than the six emotions such as "surprise", "happiness", "sadness", "displeasure", "anger" and "fear" may be further included as an emotion recognized and output by the emotion recognizer 74a.

In this case, the emotion recognizer 74a may output one emotional class selected from "surprise", "happiness", "sadness", "displeasure", "anger", "fear" and "neutrality" as an emotion recognition result or output probability values for respective emotional classes, such as x % of "surprise", x % of "happiness", x % of "sadness", x % of "displeasure", x % of "anger", x % of "fear" and x % of "neutrality" as an emotion recognition result.

When a user's emotion is recognized using an artificial intelligence model which has learned emotions to be recognized through deep learning, tagging values of data used for deep learning are output as result values.

Meanwhile, user's emotions cannot be finally output as one emotion in real environments in many cases. For example, the face of a user may express displeasure although the user verbally expresses a pleased emotion. In this manner, peoples express different emotions for respective modal inputs such as audio, image and text in many cases.

Accordingly, when emotions of a user are recognized and output as a single final emotional value, or different emotions for audio, image and text, inconsistent emotions, similar emotions and the like are ignored, emotions different from emotions actually felt by the user may be recognized.

To recognize and manage each emotion on the basis of all exposed information of a user, the emotion recognizer 74a according to an embodiment of the present disclosure can have a structure in which emotion recognition can be performed for respective unimodal inputs of audio, image and text and emotion recognition can also be performed with a multimodal input.

That is, the emotion recognizer 74a according to an embodiment of the present disclosure can recognize user's emotions input at a specific timing for respective unimodal inputs and simultaneously recognize the user's emotions with a multimodal input compositely.

The plurality of modal recognizers 521, 522 and 523 recognizes and processes one piece of unimodal input data and may be called a unimodal recognizer.

The emotion recognizer 74a according to an embodiment of the present disclosure can divide the input data 590 for respective unimodal inputs to generate a plurality of pieces of unimodal input data. A modal divider 530 can divide the input data 590 into a plurality of pieces of unimodal input data.

Here, the plurality of pieces of unimodal input data may include image unimodal input data, audio unimodal input data, and text unimodal input data separated from video data including the user.

For example, the input data 590 may be video data including captured images of a user, and the video data may include video data including a captured image of the face of the user, and the like and audio data including speech uttered by the user.

In this case, the modal divider 530 can divide the input data 590 into text unimodal input data 531 obtained by converting the audio data included in the input data 590 into text data, and sound unimodal input data of the audio data, such as a speech tone, magnitude and height.

The text unimodal input data may be data obtained by converting sound separated from the video data into text. The sound unimodal input data may be a sound source file of the audio data or a file obtained by performing preprocessing such as noise removal from the sound source file.

In addition, the modal divider 530 can separate image unimodal input data 533 including one or more pieces of face image data from the video data included in the input data 590.

The divided unimodal input data 531, 532 and 533 can be input to a unimodal preprocessor 520 including the plurality of modal recognizers 521, 522 and 523 trained to recognize emotional information of a user on the basis of the unimodal input data 531, 532 and 533.

For example, the text unimodal input data 531 can be input to the text emotion recognizer 521 which performs deep learning using text as learning data.

The sound unimodal input data 532 can be input to the speech emotion recognizer 522 which performs deep learning using speech learning data.

The image unimodal input data 533 including one or more pieces of face image data can be input to the face emotion recognizer 523 which performs deep learning using image learning data.

The text emotion recognizer 521 can recognize a user's emotion by recognizing words and sentence structures included in speech-to-text (STT) data. For example, when many words related to happiness are used or a word that strongly expresses a degree of happiness is recognized, a probability value for the emotional class of "happiness" can be recognized as a higher value than those for other emotional classes. Alternatively, the text emotion recognizer 521 can directly output the emotional class of "happiness" corresponding to recognized text as an emotion recognition result.

In addition, the text emotion recognizer 521 can output a text feature point vector along with the emotion recognition result.

The speech emotion recognizer 522 extracts feature points of input speech data. Here, the speech feature points may include the tone, volume, waveform and the like of speech. The speech emotion recognizer 522 can identify a user's emotion by detecting the tone of the speech.

Further, the speech emotion recognizer 522 can also output detected speech feature point vectors along with an emotion recognition result.

The face emotion recognizer 523 can recognize an expression of a user by detecting a face region of the user from input image data and recognizing expression landmark point information as feature points constituting the facial expression. In addition, the face emotion recognizer 523 can output emotional classes corresponding to the recognized expression or a probability value for each emotional class and also output a face feature point (expression landmark point) vector.

FIG. 6 is a diagram referred to in description of emotion recognition according to an embodiment of the present disclosure and illustrates components of an expression.

Referring to FIG. 6, eyebrows 61, eyes 62, cheeks 63, a forehead 64, a nose 65, a mouth 66 and a chin 67 may correspond to expression landmark points.

The expression landmark points 61 to 67 are exemplary and the types and the number thereof may be changed.

For example, only a small number of expression landmark points having strong characteristics, such as the eyebrows 61, eyes 62 and mouth 66, may be used or expression landmark points greatly changing when a user has a specific expression may be used.

Meanwhile, the face emotion recognizer 523 can recognize a facial expression on the basis of the positions and shapes of the expression landmark points 61 to 67.

The face emotion recognizer 523 can include an artificial neural network which has been trained through deep leaning using image data including at least parts of the expression landmark points 61 to 67 to recognize a facial expression of the user.

For example, when the user opens the eyes 62 wide and opens the mouth 66 wide, the face emotion recognizer 523 can identify the user's emotion as happiness from among emotional classes or output an emotion recognition result having a highest probability value for happiness.

Meanwhile, each of the plurality of modal recognizers may include an artificial neural network corresponding to input characteristics of unimodal input data input thereto. Further, the multimodal emotion recognizer 511 may also include an artificial neural network corresponding to characteristics of input data.

For example, the face emotion recognizer 523 which performs image-based learning and recognition may include a convolutional neural network (CNN), other emotion recognizers 521 and 522 may include a DNN, and the multimodal emotion recognizer 511 may include a recurrent neural network (RNN).

The modal emotion recognizers 521 and 522 and 523 can recognize emotional information included in the unimodal input data 531, 532 and 533 respectively input thereto and output emotion recognition results. For example, the modal emotion recognizers 521 and 522 and 523 can output emotional classes having highest probabilities from among a predetermined number of preset emotional classes as emotion recognition results or output probability values for the respective emotional classes as emotion recognition results.

The modal emotion recognizers 521 and 522 and 523 can learn and recognize text, audio and image in deep learning structures thereof and derive median vector values composed of feature point vectors for respective unimodal inputs.

Further, the multimodal recognizer 510 can perform multimodal deep learning with median vector values of audio, image and text.

In this manner, the input of the multimodal recognizer 501 is generated on the basis of outputs of the modal emotion recognizers 521, 522 and 523, and thus the modal emotion recognizers 521, 522 and 523 can operate as a kind of preprocessor.

The emotion recognizer 74a according to an embodiment of the present disclosure can use a total of four deep learning models: deep learning models of the three modal emotion recognizers 521, 522 and 523 and a deep learning model of one multimodal recognizer 510.

The multimodal recognizer 510 may include a combiner 512 which combines feature point vectors output from the plurality of modal recognizers 521, 522 and 523, and a multimodal emotion recognizer 511 trained to recognize emotional information of a user included in output data of the combiner 512.

Here, the combiner 512 can synchronize output data of the plurality of modal recognizers 521, 522 and 523, concatenate feature point vectors and output the concatenated feature point vectors to the multimodal emotion recognizer 511.

The multimodal emotion recognizer 511 can recognize emotional information of a user from input data and output an emotion recognition result.

For example, the multimodal emotion recognizer 511 can output an emotional class having highest probability from among a predetermined number of preset emotional classes or output a probability value for each emotional class as an emotion recognition result.

Accordingly, the emotion recognizer 74a according to an embodiment of the present disclosure can output a plurality of unimodal emotion recognition results and a single multimodal emotion recognition result.

The emotion recognizer 74a according to an embodiment of the present disclosure can output a plurality of unimodal emotion recognition results and a single multimodal emotion recognition result at levels (probabilities) for respective emotional classes.

For example, the emotion recognizer 74a can output probability values for emotional classes of "surprise", "happiness", "neutrality", "sadness", "displeasure", "anger" and "fear", and a high probability value can represent that the likelihood of the corresponding emotional class being a recognized emotional class is high. Here, the sum of probability values of the seven emotional classes is 100%.

The emotion recognizer 74a can output a composite emotion recognition result including the emotion recognition results 521, 522 and 523 of the plurality modal recognizers and the emotion recognition result of the multimodal recognizer 511.

Accordingly, the robot 100 can provide emotional interchange user experience UX on the basis of three unimodal emotion recognition results and one multimodal emotion recognition result.

The emotion recognizer 74a can output the majority recognition result in a composite emotion recognition result and a recognition result having a highest probability value as final emotion recognition results according to settings. Alternatively, the controller 140 of the robot 100 which has received a plurality of emotion recognition results can determine a final recognition result according to a predetermined standard.

The emotion recognizer 74a according to the present disclosure can recognize emotions of audio (speech tone or the like), image (facial expression or the like) and text (meanings of words) as levels and manage the same. Accordingly, emotion interchange user experience UX can be processed differently for respective modal inputs.

In addition, emotion recognition results for respective unimodal inputs (audio, image and text) and a multimodal emotion recognition result can be simultaneously output at a time. Since emotions with respect to audio, image and text input at a time can be compositely recognized, inconsistent emotions for respective unimodal inputs in a multimodal emotion can be recognized to ascertain emotional propensity of the user. Accordingly, even if negative inputs are applied to some modal inputs, an overall emotion may be recognized to provide emotional interchange user experience UX corresponding to positive input that is a real emotional state of the user.

According to the present disclosure, the robot 100 may include the emotion recognizer 74a or communicate with the server 70 including the emotion recognizer 74a to detect a user's emotion per unimodal input.

Furthermore, according to the present disclosure, emotional pattern analysis only for a user can be performed and emotion recognition per modal input can be used for emotional care (treatment).

In conventional emotion recognition methods, when inconsistent emotions are recognized due to different recognition results for respective modal inputs with respect to input data, it is difficult to map emotions to one and analyze the same.

However, according to the present disclosure, it is possible to process many inputs and outputs such that they correspond to real life situations.

To complement an input recognizer with low performance, the present disclosure can configure a recognizer structure in which a plurality of recognizers 511, 521, 522 and 523 complement one another through fusion of many inputs and outputs.

The emotion recognizer 74a according to an embodiment of the present disclosure can separate speech into sound and meaning to generate three inputs of an image, sound and STT from image and sound inputs.

Furthermore, to obtain optimal performance for the three inputs, the emotion recognizer 74a can be configured to have different artificial neural network models, such as a convolutional neural network (CNN) and along short-term memory (LSTM), for respective inputs. For example, the image-based recognizer 523 may have a CNN structure and the multimodal emotion recognizer 511 may have an LSTM structure. Accordingly, a neural network customized for each input characteristic can be configured.

Outputs of the unimodal recognizers 521, 522 and 523 for respective inputs may be probability values for seven types of emotional classes and vector values of feature points representing such emotions.

The multimodal recognizer 510 can combine vector values of feature points representing an emotion through a total-combining layer and an LSTM instead of simply calculating emotional values for three inputs through a statistical method, to thereby aid in performance improvement in such a manner that a problem that one recognizer has difficulty solving is solved with the aid of another recognizer and cover various real-life cases.

For example, when only speech is heard in a place where it is difficult to recognize a face, the speech-based recognizers 521 and 522 and the multimodal emotion recognizer 511 can recognize a user's emotion in the emotion recognizer 74a according to an embodiment of the present disclosure.

Furthermore, the emotion recognizer 74a can recognize a complicated emotional state of a user by fusing recognition results with respect to image, audio and text data and a multimodal recognition result and thus can recognize user's emotions in various real-life situations.

FIGS. 7 to 10 are diagrams referred to in description of expression of characters according to an embodiment of the present disclosure.

The robot 100 according to an embodiment of the present disclosure can generate an avatar that expresses an emotion of a predetermined user on the basis of emotion recognition results recognized thereby or emotion recognition results received from other devices.

According to an embodiment, the robot 100 can generate an avatar by mixing face image data of a user with an expression landmark point image generated corresponding to recognized emotional information through augmented reality. For example, frown eyes, eyebrows and forehead can be overlaid and displayed at the positions of the eyes, eyebrows and forehead of a face image of a user through augmented reality. Accordingly, an avatar that expresses displeasure of the user can be generated.

Further, the robot 100 can generate an animated character first on the basis of face information of a user. This animated character can also be generated using expression landmark points of the user. For example, in the case of a user with a big nose, an animated character having a big nose can be generated. Furthermore, the robot 100 can generate an avatar that expresses a specific emotion of a user by changing expression landmark points of the generated animated character such that they correspond to the recognized emotional information.

Alternatively, the robot 100 can generate the avatar by changing expression landmark points of a preset animated character such that they correspond to the recognized emotional information. In this case, the avatar can be generated rapidly and easily because user characteristics from which only the expression landmark points are recognized are reflected in the previously generated animated character to correct the animated character.

For example, an avatar can be generated by selecting one of basic animated characters that are stored in the storage 130 of the robot 100 or can be received through the communication part 190 and reflecting detected expression landmark points of a user in the selected character.

Further, an avatar expressing a specific emotion of a user can be generated by changing expression landmark points of a generated animated character such that they correspond to recognized emotional information.

FIGS. 7 to 10 show examples in which seven emotional classes are represented using a preset animated character and a small number of expression landmark points.

Referring to FIG. 7, default expressions corresponding to emotional classes of "happiness", "surprise", "displeasure", "anger", "fear", "sadness" and "neutrality" can be stored.

As a recognized emotional level of a user increases, a degree of representing a specific emotion can be greatly changed in default expression. For example, if a happiness level is high, a degree of opening the mouth which is a landmark point included in the happiness emotional class can be changed more greatly.

An avatar according to an embodiment of the present disclosure can be generated such that specific landmark points are emphasized as if a caricature is drawn or can be composed of only specific landmark points.

FIGS. 8 to 10 illustrate avatars composed of only eyebrows, eyes and a mouth.

Referring to FIG. 8, when a user's emotion is recognized as "neutrality", an avatar having a smiling neutral expression 810 can be generated. The neutral expression 810 may be set as a default expression used when the robot 100 does not recognize a specific emotion.

When a user's emotion is recognized as "surprise", an avatar having a surprised expression 820 with raised eyebrows and an open mouth can be generated.

When a user's emotion is recognized as "displeasure", an avatar having a displeased expression 830 with corners of the mouth down can be generated.

Even in the case of recognition of the same emotional class, different avatars may be generated. For example, different avatars can be generated according to sizes and positions of detected landmark points of a user and user emotion expression methods. Further, different avatars may be generated according to detected emotional levels.

FIG. 9 shows expressions of an avatar expressing emotional classes of "anger". Referring to (a) and (b) of FIG. 9, a first anger expression 910 and a second anger expression 920 can be represented using different eye and mouth shapes.

FIG. 10 shows expressions of an avatar expressing emotional classes of "happiness". Referring to (a), (b) and (c) of FIG. 10, a first happy expression 1010, a second happy expression 1020 and a third happy expression 1030 can be represented using different eye and mouth shapes.

As described above with reference to FIGS. 7 to 10, the robot 100 according to an embodiment of the present disclosure can generate an avatar by mapping emotional information of a user to face information of the user.

According to an embodiment of the present disclosure, an avatar follows face feature points (landmarks) from recognition of an emotion of a user to expression of the emotion.

It is possible to provide fun to a user and satisfy a user's desire for expressing personality by generating an avatar from face characteristics of the user in the aforementioned emotion expression procedure.

Furthermore, a user's emotion (facial expression) can be generated as content and used.

FIG. 11 is a flowchart showing a method for operating a robot according to an embodiment of the present disclosure.

Referring to FIG. 11, the robot 100 according to an embodiment of the present disclosure can acquire data related to a user (S1110).

Here, the data related to the user may include image data including the face of the user and audio data uttered by the user. The image data including the face of the user may be acquired through a camera of the image acquisition part 120 and the audio data uttered by the user may be acquired through a microphone of the audio input part 125. That is, the present disclosure can acquire the voice of the user as well as the face of the user acquired through a camera and use both the image data and the audio data.

Further, the data related to the user may be video data captured by the user or real-time video data captured by the user. That is, the robot 100 can use both stored data and data input in real time.

Emotional information may be one of the above-described plurality of emotional classes or may be based on a probability value for each emotional class. That is, an emotion recognition result obtained from recognition of emotional information may be an emotional class selected from the emotional classes or may include a probability value for each emotional class.

According to an embodiment, the robot 100 may include the emotion recognizer 74a which includes an artificial neural network trained to recognize emotional information on the basis of image data and audio data, and when the data related to the user is input, recognizes emotional information of the user.

As described above with reference to FIG. 5, the emotion recognizer 74a is trained to recognize emotional information through a plurality of unimodal inputs and a multimodal input based on the plurality of unimodal inputs and can output a composite emotion recognition result including emotion recognition results for the plurality of unimodal inputs and an emotion recognition result for the multimodal input.

Alternatively, the server 70 may include the emotion recognizer 74a including an artificial neural network trained to recognize emotional information on the basis of image data and audio data. That is, the server 70 may be an emotion recognition server which includes the emotion recognizer 74a and performs emotion recognition.

As described above with reference to FIG. 5, the server 70 including the emotion recognizer 74a may include a plurality of artificial neural networks trained with unimodal inputs and may further include an artificial neural network trained with a multimodal input based on the unimodal inputs.

In this case, step S1120 of recognizing the emotional information of the user may include a step in which the robot 100 transmits the data related to the user to the emotion recognition server 70 and a step in which the robot 100 receives an emotion recognition result from the emotion recognition server 70.

The emotion recognizer 74a can recognize the emotional information of the user on the basis of the data related to the user (S1120).

For example, the emotion recognizer 74a can recognize the emotional information on the basis of the image data including the face of the user and the audio data uttered by the user.

The emotion recognizer 74a can identify the emotion of the user using both an emotional information recognition result based on the image data and an emotional information recognition result based on the audio data.

In this case, the emotion information recognition results may include an emotion recognition result recognized from text data obtained by converting the audio data uttered by the user into text and an emotional information recognition result recognized from sound data of the audio data uttered by the user.

The robot 100 can generate an avatar by mapping the recognized emotional information of the user to the face information of the user included in the data related to the user (S1130).

The avatar is a character in which at least one of features extracted from the face information of the user has been reflected and can represent personality of the user. For example, the avatar can be generated using at least one of expression landmark points extracted from the face information of the user. If an expression landmark point of a specific user is eyes, various emotions can be expressed using the eyes as feature points. If eyes and a mouth are regarded as landmark points, the eyes and mouth may be mapped to a plurality of sample characters or only the eyes and mouth may be characterized like a caricature.

The robot 100 can associate the generated avatar with information on the user and store the associated avatar (s1140) and freely use the stored avatar (S1150).

For example, one of stored avatars of the user can be displayed on the display 182.

Further, the generated avatar can be usually used as a default screen displayed on the display 182 of the robot 100 according to a command or settings of the user.

For example, the avatar 810 with a neutral expression can be used as a default screen of the robot 100. That is, one of generated avatars can be used as a facial expression of the robot 100. Accordingly, it is possible to reduce resistance of the user to use of the robot and help the user feel familiar with the robot.

In addition, in specific situations in which a specific user transmits a request, a command and information to other people using the robot 100, at least one of stored avatars of the user can be used.

According to an embodiment, when predetermined data is transmitted to other devices, the robot 100 can transmit the aforementioned avatar or the recognized emotional information along with the predetermined data.

The user can intuitively represent himself/herself and transmit a current specific emotion to other people using other devices by transmitting the avatar along with the predetermined data through the robot 100.

Since transmission of the avatar does not consider the hardware performance of a device on the reception side, the robot 100 can transmit the recognized emotional information along with the predetermined data. A robot 100 on the reception side can generate and display the avatar using the received emotional information in accordance with hardware characteristics. Accordingly, the robot 100 on the reception side can imitate expressions, emotions and actions of the user without affecting or being affected by physical characteristics thereof.

According to an embodiment of the present disclosure, the robot 100 can acquire image data or audio data of the user for a predetermined time. Accordingly, the emotion recognizer 74*a* can recognize emotional information of the user for the predetermined time on the basis of the image data and the audio data of the user.

For example, the emotion recognizer 74*a* can continuously perform emotion recognition for input data for a predetermined time instead of performing emotion recognition one time and ending emotion recognition.

In this case, the controller 140 of the robot 100 can map the emotional information of the user to the image data of the user and synchronize the audio data of the user therewith to generate a video of the avatar.

Alternatively, the emotion recognizer 74*a* can perform a plurality of emotion recognition operations at predetermined intervals on input data for a predetermined time and output a plurality of emotion recognition results simultaneously or sequentially.

The controller 140 of the robot 100 can control a degree of change in expression landmark points of the avatar in response to the recognized emotional information of the user.

The controller 140 can augment an emotional expression by controlling the expression landmark points of the avatar to greatly change or mitigate the emotional expression by controlling the expression landmark points to change slightly according to settings.

According to an embodiment of the present disclosure, the voice output from the audio output part 181 can be changed on the basis of the recognized emotional information of the user.

Furthermore, according to an embodiment of the present disclosure, at least one of settings related to audio of the audio output part 181 can be changed on the basis of the recognized emotional information of the user.

According to an embodiment of the present disclosure, videotelephony can be performed while changing emotional expressions.

For example, emotions of a caller and a called party may be bluntly exposed during videotelephony. A videotelephony user who hates to bluntly express emotions may use an avatar with a mitigated emotional expression.

Furthermore, a user who wants to correctly recognize or empathize with an emotion of a videotelephony partner during video telephony may use an avatar with an augmented emotional expression. Accordingly, it is possible to intuitively recognize emotions in conversations to induce positive interaction.

Moreover, it is possible to recognize emotions of the other party in real time during videotelephony and refine and change violent speech such as abuse.

The robot 100 according to an embodiment of the present disclosure can generate an avatar expressing emotions of a predetermined user on the basis of an emotion recognition result recognized thereby or an emotion recognition result received from the server 70.

According to an embodiment, the robot 100 can generate an avatar by combining an expression landmark point image generated corresponding to recognized emotional information with face image data of a user through augmented reality.

Alternatively, the robot 100 may generate an animated character first on the basis of face information of the user. Such an animated character can be generated using detected expression landmark points of the user. Further, the robot 100 may generate an avatar expressing a specific emotion of the user by changing the expression landmark points of the generated animated character such that the expression landmark points correspond to the recognized emotional information.

Alternatively, the robot 100 may generate the avatar by changing expression landmark points of a preset animated character such that the expression landmark points correspond to the recognized emotional information.

For example, one of basic animated characters which are stored in the storage 130 of the robot 100 or can be received through the communication part 190 is selected and detected expression landmark points of the use are reflected in the selected character to generate the avatar.

Further, it is possible to generate an avatar expressing a specific emotion of the user by changing expression landmark points of a generated animated character such that the expression landmark points correspond to the recognized emotional information.

According to an embodiment, the robot 100 can detect a motion of the user, determine a motion corresponding to the motion of the user and then perform the corresponding motion.

For example, the controller 140 may detect a user's action of rotating the head from an image acquired through the image acquisition part 120. In this case, the controller 140 can control the robot 100 such that the robot 100 rotates the head in the same direction as the rotating direction of the user's head.

In addition, when a user's action of raising an arm is detected, the controller 140 can determine a corresponding motion corresponding to the action of raising the arm. In the case of a robot in the form of a human body including arms, the controller 140 can control the robot such that the robot raises an arm in response to an action of a user. In the case of a robot 100 without arms, the robot can be configured to perform a substitute action such as shaking the head or the body in response to an action of a user.

That is, the controller 140 can determine a corresponding motion corresponding to a user's action in consideration of hardware use of the robot 100 and control the robot 100 such that the robot 100 performs the determined corresponding motion.

Further, the robot 100 can detect an action of a user, map emotional information of the user to the action of the user to determine a corresponding motion and then perform the corresponding motion. For example, the robot 100 can make a large motion or a little motion in response to an emotion of the user.

FIG. 12 is a flowchart showing a method for operating a robot according to an embodiment of the present disclosure and illustrates emotion interchange user experience UX and FIG. 13 is a diagram referred to in description of emotion expression of a robot according to an embodiment of the present disclosure.

First, the emotion recognizer 74a included in the robot 100 or the server 70 can recognize emotions of a user and/or a videotelephony partner (S1210).

For example, emotion recognition results can be leveled with numerical values such as probability values of seven representative emotional classes of "surprise", "happiness", "sadness", "displeasure", "anger", "fear" and "neutrality" and output. Further, emotion recognition results may be leveled with grades such as strong/mid/weak classified in response to probability values instead of accurate probability values and output.

The robot 100 can extract feature points of the user and map the recognized emotion recognition result to the feature points (S1220). The feature points of the user may be landmark points of the face of the user and may be stored as a database through a learning process (S1225). Newly recognized feature points of the user may be added to the database and used as learning data.

The robot 100 can combine a leveled emotion of the user and the feature points and map the combined result to a corresponding character and motion (S1230).

For example, the robot 100 may generate at least apart of the face of an avatar expressing a specific emotion or determine a corresponding motion by combining the leveled emotion and feature points of the user.

Thereafter, the robot 100 can express an emotion of the videotelephony user on the basis of the generated avatar and the determined motion (S1240).

The robot 100 can display landmark points of the generated avatar overlaid on the face of the videotelephony user or display the entire avatar (S1240).

Further, the robot 100 can perform the determined corresponding motion (S1240).

FIG. 13 shows an example in which the robot 100 expresses a happy emotion using a shape of eyebrows corresponding to one of expression landmark points and a motion 1320 of shaking the body.

According to an embodiment of the present disclosure, it is possible to perform videotelephony using a robot and combine emotion recognition/expression with videotelephony to provide an emotional call service.

The robot can recognize emotions such as "happiness", "sadness", "anger", "surprise", "fear", "neutrality" and "displeasure" of at least one of videotelephony participants, map the recognized emotions to a character and display the character during videotelephony.

Furthermore, according to an embodiment of the present disclosure, it is possible to aid in communication between people by recognizing emotions of the people in real time during videotelephony and transmitting the emotions to the other party.

In addition, it is possible to provide an emotional call service through a motion function that cannot be executed by mobile terminals and the like and can be executed only by robots. Fun and lock-in effects can be expected from a robot that imitates a motion of a videotelephony participant.

Moreover, it is possible to provide an avatar expressing a specific gesture and facial expression of a user through emotion recognition. Videotelephony without faces of speakers can be performed according to user settings or a device used for videotelephony.

FIGS. 14 to 16 are diagrams referred to in description of videotelephony using a robot according to an embodiment of the present disclosure.

FIG. 14 shows an example in which two people use videotelephony using a first robot 100a and a second robot 100b.

As shown in FIG. 14, P2P videotelephony between the first robot 100a and the second robot 100b can be performed. Differently from the example of FIG. 14, videotelephony can also be performed between a robot 100 and a mobile terminal.

During videotelephony using the robot 100, a call can be made only using characters with the faces of a caller and a called party hidden and the characters can imitate emotions and feature points of the caller and the called party such that the caller and the called party can be identified.

A method of identifying an emotion and feature points of a specific user can be performed by characterizing and expressing a motion, voice and face motion of the user.

FIG. 15 shows an example in which a user of the second robot 100b performs videotelephony using a character expressing emotions of a user of the first robot 100a. In this example, the user of the second robot 100b can recognize emotions of the videotelephony partner on the basis of videotelephony data received from the first robot 100a and perform videotelephony while viewing the character expressing emotions of the videotelephony partner.

FIG. 16 shows an example in which both users of the first robot 100a and the second robot 100b perform videotelephony using characters.

During videotelephony, it is possible to easily grasp emotions of the other party and expect fun and lock-in effects by recognizing emotions of a user and displaying various characters mapped to recognition result values overlaid on the face of the user or displaying the face of the user through characters.

Furthermore, a robot recognizes a gesture of a user and makes a motion mapped to the gesture during videotelephony and thus the user can intuitively recognize an emotion of the other party through the motion of the robot.

According to an embodiment, for a user having resistance to exposure of the face and surrounding environments, the face and surrounding environments of the user can be recognized and a character and a background image can be generated on the basis of the recognized information and used. Accordingly, a user having resistance to videotelephony due to exposure of surrounding environments can also use videotelephony.

The robot 100 according to an embodiment of the present disclosure can understand emotional information (feature points) of the user and reproduce the emotional information when the robot 100 is represented as an avatar.

In this case, the robot 100 can store specific habits or emotions of the user and perform a call conversation as a proxy when represented as an avatar during videotelephony. In the case of absence of the user, the robot 100 that imitates characteristics of the user can perform a proxy role. For example, when a missed call is received, the robot 100 on the reception side can perform a simple call for indicating absence of the user using a character based on the face and emotions of the user.

According to an embodiment of the present disclosure, recognized emotional information can be rendered as a character in real time.

For example, if expression landmark points of a specific user are eyes, various emotions can be expressed continuously using the eyes as feature points.

If the eyes and the mouth are landmark points, the eyes and the mouth can be mapped to a plurality of sample characters or only the eyes and the mouth can be characterized like a caricature.

FIG. 17 is a flowchart showing a method for operating a robot according to an embodiment of the present disclosure and shows a method for operating a robot which recognizes emotions of a videotelephony partner during video telephony.

Referring to FIG. 17, the robot 100 according to an embodiment of the present disclosure can receive image and audio data from a robot of a videotelephony partner (S1710) and recognize emotional information of the videotelephony partner on the basis of data received from the robot of the videotelephony partner (S1720).

The emotional information may be based on one of the above-described emotional classes or a probability value for each of the plurality of emotional classes. That is, an emotion recognition result obtained from emotional information recognition may be an emotional class selected from the emotional classes. For example, the recognized emotional information may be one of "happiness", "surprise", "displeasure", "anger", "fear", "sadness" and "neutrality".

Alternatively, an emotion recognition result obtained from emotional information recognition may include a probability value for each emotional class. For example, probability values for respective emotional classes, such as x % of "surprise", x % of "happiness", x % of "sadness", x % of "displeasure", x % of "anger", x % of "fear" and x % of "neutrality" can be output as emotion recognition results.

The controller 140 of the robot 100 can generate an avatar by mapping the recognized emotional information of the videotelephony partner to face information of the videotelephony partner included in the data received from the robot of the videotelephony partner (S1730).

Further, the controller 140 of the robot 100 can control the display 182 such that the generated avatar is displayed thereon (S1740). Accordingly, the user of the robot 100 can intuitively recognize emotions of the videotelephony partner while viewing the avatar expressing emotions of the videotelephony partner.

During voice call or videotelephony using the robot 100, the robot 100 can be configured to recognize personal habits or unique characteristics of the other party and imitate the same to represent feature points (or personality) of the other party.

Accordingly, it is possible to help a user feel familiar with the robot 100 without resistance to the robot 100 and be immersed in the robot 100 as the other party during a telephone call.

As described above with reference to FIGS. 1 to 16, the controller 140 of the robot 100 can control a degree of change in expression landmark points of the avatar in response to the recognized emotional information of the videotelephony partner in the present embodiment.

The controller 140 may augment an emotional expression by controlling the expression landmark points of the avatar to change greatly or mitigate the emotional expression by controlling the expression landmark points to change slightly according to settings.

In the present embodiment, the controller 140 can also generate the avatar by changing expression landmark points of a preset animated character such that they correspond to the recognized emotional information.

Alternatively, the controller 140 can generate the avatar by changing expression landmark points of an animated character generated on the basis of face information of the videotelephony partner such that they correspond to the recognized emotional information.

Further, the controller 140 can generate the avatar by combining an expression landmark point image generated corresponding to recognized emotional information with a face image data of the videotelephony partner through augmented reality.

The generated avatar can be stored in the store 130 and the generated avatar can be used again later.

The controller 140 can store the generated avatar in association with information on the videotelephony partner. For example, when the videotelephony partner requests videotelephony again, one of an indication of the request for videotelephony and the avatar of the videotelephony partner can be displayed on the display 182.

The controller 140 of the robot 100 according to an embodiment of the present disclosure can detect a motion of the videotelephony partner on the basis of received image data (S1750) and map the recognized emotional information of the videotelephony partner thereto to determine a corresponding motion (S1760).

Further, the controller 140 can control the robot 100 such that the robot 100 can perform the determined corresponding motion (S1770).

For example, when the face of the partner is recognized from a received image and a motion of the face is detected during videotelephony, the controller 140 can recognize the direction of the motion of the face of the partner and control the robot 100 to rotate in the direction.

The controller 140 can control the robot 100 such that the robot 100 rotates in the same direction as the direction of the face of the partner when the direction of the motion of the face of the partner is a vertical direction and rotates in the opposite direction according to reversal of the image when the direction is a horizontal direction.

According to an embodiment, when motion of the face of the videotelephony partner is detected, the controller 140 can differently control a corresponding motion in directions of the motion of the face of the videotelephony partner.

For example, the controller 140 can set different rotation angles in directions of a motion of the face of the videotelephony partner such that the robot 100 rotates 3 degrees at a time in the vertical direction and rotates 10 degrees at a time in the horizontal direction.

In addition, when there is no motion of the face of the videotelephony partner for 3 seconds in the image, the controller 140 can reflect motions of the videotelephony partner by controlling the robot 100 such that the robot 100 maintains a rotated state if the face is being recognized and returns to the original position if not.

According to an embodiment, the controller 140 can map the recognized emotional information of the videotelephony partner to the audio data of the videotelephony partner to generate converted audio data. The audio output part 181 can utter the converted audio data under the control of the controller 140.

In this case, the controller 140 can change at least one of the tone and volume of the audio data of the videotelephony partner on the basis of the recognized emotional information of the videotelephony partner. For example, when the recognized emotional information of the videotelephony partner is "happiness", the tone of the audio data of the videotelephony partner can be increased.

When the recognized emotional information of the videotelephony partner is "displeasure" or a recognized speech of the videotelephony partner includes abuse, the controller 140 can control the audio output part 181 such that the audio output part 181 reduces the volume of the audio data of the videotelephony partner and outputs the audio data reduced in volume.

The controller 140 can augment an emotional expression by controlling the audio data to greatly change or mitigate the emotional expression by controlling the audio data to change slightly according to settings.

Accordingly, it is possible to prevent the user from excessively empathizing with emotions of the videotelephony partner or transmit more emotions than necessary.

According to an embodiment, for users having resistance to exposure of surrounding environments, a background image can be generated and the generated avatar can be displayed on the generated background image. Accordingly, the background of the current user can be prevented from being exposed to the videotelephony user.

Recognition (S1720) of emotions of the videotelephony user can be performed by the robot 100.

To this end, the robot 100 can include the emotion recognizer 74a recognizer 74a which includes an artificial neural network trained to recognize emotional information on the basis of image data and audio data, and when data received from the robot of the videotelephony user is input, recognizes emotional information of the videotelephony user.

As described above with reference to FIG. 5, the emotion recognizer 74a is trained to recognize emotional information through a plurality of unimodal inputs and a multimodal input based on the plurality of unimodal inputs and can output a composite emotion recognition result including emotion recognition results for the plurality of unimodal inputs and an emotion recognition result for the multimodal input.

Meanwhile, recognition (S1720) of emotions of the videotelephony user can be performed in the emotion recognition server 70 including the emotion recognizer 74a.

In this case, step S1720 of recognizing emotional information of the videotelephony user may include a step in which the robot 100 transmits data received from the robot of the videotelephony user to the emotion recognition server 70 including an artificial neural network trained to recognize emotional information on the basis of the image data and the audio data and a step in which the robot 100 receives an emotion recognition result from the emotion recognition server 70.

As described above with reference to FIG. 5, the emotion recognition server 70 may include the plurality of artificial neural networks 521, 522 and 523 trained using unimodal inputs. The emotion recognition server 70 may further include the artificial neural network 511 trained using a multimodal input based on the plurality of unimodal inputs. The artificial neural networks 521, 522 and 523 included in the emotion recognition server 70 may be artificial neural networks suitable for respective pieces of input data.

According to an embodiment, the robot 100 may map emotional information to sound output from the audio output part 181. For example, the robot 100 can recognize emotions of the partner in real time, purify a violent speech such as abuse, modify the speech and transmit the speech. Further, the robot 100 can emphasize exclamation in a speech, increase the volume and output the speech.

According to the present disclosure, it is possible to express emotions in interaction with a user or videotelephony with the other party using multimodal emotional values recognized from audio, image and text of the user. Here, recognized emotions can be represented as positive/negative/neutral or based on information recognized as probability values of the seven emotional classes.

In addition, emotion recognition accuracy can be enhanced because emotion recognition results with respect to audio, image and text data and a multimodal emotion recognition result can be used in a complementary manner.

Furthermore, it is possible to identify a user having inconsistent emotional characteristics with respect to emotional information of audio, video and text data, store feature points as a database and use the database for emotional interchange user experience UX between a user and a robot.

According to an embodiment of the present disclosure, it is possible to perform leveling for augmenting or mitigating an emotional expression to an exaggerated emotional expression or a passive emotional expression depending on an emotion recognition result value of a user.

The robot 100 can understand emotional feature points of a user and reproduce recognized emotional feature points through an avatar. For example, the robot 100 can recognize a unique feature point of a user (a specific emotional expression of a speaker) such as raising of the corners of the mouth when the user smiles and map the feature point to an avatar.

Furthermore, the robot 100 can store specific habits or emotions of a user and perform a telephone call as if an avatar serves as a proxy of the user when the robot 100 is represented as the avatar in which emotional feature points of the user have been reflected.

FIGS. 18 to 21 are flowcharts showing method for operating robot systems according to an embodiment of the present disclosure.

Referring to FIG. 18, a robot system according to an embodiment of the present disclosure can include a first robot 100a and a second robot 100b which perform videotelephony.

The first robot 100a and the second robot 100b can transmit/receive data necessary for videotelephony while performing videotelephony (S1810).

For example, the second robot 100b may receive image data in which a user of the first robot 100a has been captured, audio data uttered by the user of the first robot 100a, and the like from the first robot 100a (S1810). Thereafter, the first robot 100a and the second robot 100b may continuously transmit/receive data necessary for videotelephony while performing videotelephony.

Upon reception of the image data and the audio data from the first robot 100a, the second robot 100b can recognize emotions of the user of the first robot 100a who is a videotelephony partner on the basis of the received image data and audio data (S1820).

To this end, the second robot 100b can include the above-described emotion recognizer 74a.

The controller 140 can generate an avatar of the videotelephony partner by mapping a result of recognition of emotions of the videotelephony partner output from the emotion recognizer 74a to face information of the videotelephony partner acquired on the basis of the image data in which the user of the first robot 100a has been captured (S1830).

The controller 140 can detect motion of the videotelephony partner from the image data in which the user of the first robot 100a has been captured (S1840) and determine a corresponding motion which will be performed by the second robot 100b in response to the motion of the videotelephony partner (S1850).

Then, the second robot 100b can display the generated avatar and perform the corresponding motion under the control of the controller 140 to express emotions of the videotelephony partner (S1860).

Accordingly, the user of the second robot 100b can be intuitively aware of emotions of the videotelephony partner from the character displayed by the second robot 100b and the motion of the second robot 100b.

In the same manner, the first robot 100a can recognize emotions of the user of the second robot 100b, display an avatar based on an emotion recognition result and perform a corresponding motion to express emotions of the user of the second robot 100b.

The robots 100a and 100b according to an embodiment of the present disclosure can normally recognize emotions of a user as audio, images and text and store feature points of the emotions of the user. In addition, the robot can normally perform a telephone call with the other party through an avatar on the basis of stored emotional feature point information of the user.

In addition, in P2P videotelephony using the robots 100a and 100b, emotions of users can be mapped to avatars and videotelephony can be performed using the emotional avatars. Recognized emotions of a caller or a called party may be mapped to an avatar in real time such that the avatar moves, and the avatar can emphasize and represent feature points of emotions.

During videotelephony, it is possible to easily grasp emotions of speakers by recognizing emotions of the speakers in real time and displaying various characters mapped to recognition result values overlaid on the faces of the speakers or displaying the characters replacing the speakers.

Furthermore, it is possible to recognize a gesture of a speaker, map the gesture to a motion of a robot and cause the robot to perform the motion during videotelephony, and thus a user can intuitively recognize emotions of the other party through a motion of the robot and experience enjoyment.

In the present disclosure, the emotion recognizer 74a can recognize multimodal emotions such as images, audio and text of users and the robots 100a and 100b can map specific emotions to avatars using recognized emotional information.

Accordingly, it is possible to recognize emotions in conversations and induce positive interaction.

Referring to FIG. 19, a robot system according to an embodiment of the present disclosure can include a first robot 100a and a second robot 100b which perform videotelephony and at least one emotion recognition servers 70b.

The embodiment of FIG. 19 differs from the embodiment of FIG. 18 in that the emotion recognition server 70b connected to the second robot 100b performs emotion recognition. To this end, the emotion recognition server 70b can include the above-described emotion recognizer 74a.

The first robot 100a and the second robot 100b can transmit/receive data necessary for videotelephony while performing videotelephony (S1910).

Upon reception of image data and audio data from the first robot 100a, the second robot 100b can transmit the received image data and audio data to the emotion recognition server 70b (S1920).

The emotion recognition server 70b can recognize emotions of a user of the first robot 100a who is a videotelephony partner on the basis of received data (S1925) and transmit an emotion recognition result to the second robot 100b (S1930).

Thereafter, the second robot 100b can generate an avatar of the videotelephony partner by mapping recognized emotional information to face information of the videotelephony partner (S1940).

If a motion of the videotelephony partner is detected from image data in which the user of the first robot 100a has been captured (S1950), the second robot 100b can determine a corresponding motion which will be performed thereby in response to the motion of the videotelephony partner (S1960).

Then, the second robot 100b can display the generated avatar and perform the corresponding motion to express emotions of the videotelephony partner (S1970).

Accordingly, the user of the second robot 100b can be intuitively aware of emotions of the videotelephony partner from the character displayed by the second robot 100b and the motion of the second robot 100b.

Referring to FIG. 20, a robot system according to an embodiment of the present disclosure can include the first robot 100a and the second robot 100b which perform videotelephony and at least one emotion recognition server 70b.

The embodiment of FIG. 20 differs from the embodiment of FIG. 19 in that detection of a motion of the videotelephony partner (S2025) is performed before an emotion recognition result is received (S2035).

Referring to FIG. 20, the second robot 100b receives data from the first robot 100a (S2010) and transmits the received data to the emotion recognition server 70b (S2020).

The second robot 100b can detect a motion of the videotelephony partner on the basis of the received data (S2025).

The emotion recognition server 70b can perform emotion recognition (S2030) and transmit an emotion recognition result to the second robot 100b (S2035).

Upon reception of the emotion recognition result (S2035), the second robot 100b can generate an avatar by mapping the emotion recognition result to user face information (S2040) and determine a corresponding motion in response to the motion of the videotelephony partner (S2050).

Thereafter, the second robot 100b can display the generated avatar and perform the corresponding motion to express emotions of the videotelephony partner (2060).

Referring to FIG. 21, a robot system according to an embodiment of the present disclosure can include the first robot 100a and the second robot 100b which perform videotelephony and at least one emotion recognition server 70a.

Referring to FIG. 21, the first robot 100a can acquire user related data including data including information on the face of a user, data including speech uttered by the user, and the like (S2110).

The first robot 100a can transmit the acquired user related data to the emotion recognition server 70a (S2115).

The emotion recognition server 70a can perform emotion recognition on the basis of the received data (S2120) and transmit an emotion recognition result to the first robot 100a (S2125).

Upon reception of the emotion recognition result (S2125), the first robot 100a can generate an avatar by mapping the emotion recognition result to user face information (S2130).

The first robot 100a can transmit recognized emotional information or the generated avatar to the second robot 100b that is a robot of the videotelephony partner (S2140) and display the generated avatar (S2150).

Alternatively, the first robot 100a may display the generated avatar (S2150) and then transmit the recognized emotional information or the generated avatar to the second robot 100b (S2140).

The second robot 100b may display the received avatar or express emotions of the user of the first robot 100a on the basis of the received emotional information according to settings.

According to at least one of embodiments of the present disclosure, it is possible to recognize a user's emotion and provide emotion based services.

Further, according to at least one of embodiments of the present disclosure, it is possible to recognize a user's emotion more accurately using an artificial intelligence trained through deep learning.

Further, according to at least one of embodiments of the present disclosure, it is possible to automatically generate and use a character expressing emotion of a user to provide fun and use convenience to the user.

Further, according to at least one of embodiments of the present disclosure, it is possible to add emotional factors to communication between a user and a robot and communication between users using characters expressing emotions of users.

Further, according to at least one of embodiments of the present disclosure, it is possible to recognize emotions of at least one of videotelephony participants and generate a character according to the recognized emotions to intuitively check emotions of a videotelephony participant.

Further, according to at least one of embodiments of the present disclosure, it is possible to transmit emotions of a videotelephony partner to a robot to improve user satisfaction and convenience.

Further, according to at least one of embodiments of the present disclosure, a robot can recognize a motion of a videotelephony partner and perform a motion corresponding thereto and thus people can conveniently use videotelephony.

The robot and robot systems according to the present disclosure are not limited to the above-described embodiments and some or all of the embodiments can be selectively combined such that the embodiments can be modified in various manners.

The robot and the method for operating a robot system according to embodiments of the present disclosure can be implemented with processor-readable code in a processor-readable medium. The processor-readable medium may include all kinds of recording devices capable of storing data readable by a processor. Examples of the processor-readable medium may include a ROM, a RAM, a CD-ROM, magnetic tapes, floppy disks, optical data storage devices, and the like and also include carrier-wave type implementation such as transmission over the Internet. Further, the processor-readable recording medium may be distributed to computer system connected through a network and computer-readable code can be stored and executed therein in a distributed manner.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A method for operating a robot, the method comprising:
acquiring data related to a user including image data including the face of the user and audio data uttered by the user;
recognizing emotional information of the user on the basis of the image data including the face of the user and the audio data uttered by the user; and
generating an avatar by mapping the recognized emotional information of the user to face information of the user included in the data related to the user,
wherein recognizing the emotional information of the user includes:
calculating probability values for each of a plurality of emotions and feature point vectors representing the plurality of emotions based on the image data including the face of the user and the audio data uttered by the user, and
concatenating the feature point vectors for the plurality of emotions.

2. The method according to claim 1, wherein the recognizing of the emotional information comprises recognizing an emotion of the user using both an emotional information recognition result based on the image data and an emotional information recognition result based on the audio data.

3. The method according to claim 2, wherein the emotional information recognition result based on the audio data includes an emotion recognition result recognized from text data obtained by converting the audio data uttered by the user into text, and an emotional information recognition result recognized from sound data of the audio data uttered by the user.

4. The method according to claim 1, further comprising changing voice output from a speaker on the basis of the recognized emotional information.

5. The method according to claim 1, further comprising changing at least one of audio related settings of a speaker on the basis of the recognized emotional information.

6. The method according to claim 1, further comprising using the generated avatar as a default screen or a screen displayed in a specific situation.

7. The method according to claim 1, wherein the data related to the user is video data in which the user has been photographed or real-time video data in which the user is photographed.

8. The method according to claim 1, further comprising associating the generated avatar with information on the user and storing the avatar.

9. The method according to claim 1, further comprising transmitting the avatar or the recognized emotional information along with predetermined data when the predetermined data is transmitted to other devices.

10. The method according to claim 1, wherein the acquiring of the data related to the user comprises acquiring image data and audio data of the user for a predetermined time,
the recognizing of the emotional information of the user comprises recognizing emotional information of the user for the predetermined time on the basis of the image data and the audio data of the user, and
the generating of the avatar comprises mapping the emotional information of the user to the image data of the user and synchronizing the audio data of the user with the mapping result to generate a video of the avatar character.

11. The method according to claim 1, further comprising displaying one of stored avatars of the user.

12. The method according to claim 1, wherein the generating of the avatar comprises controlling a degree of change in expression landmark points of the avatar in response to the recognized emotional information of the user.

13. The method according to claim 1, wherein the generating of the avatar comprises augmenting an emotional expression by controlling the expression landmark points of the avatar to change greatly or mitigating the emotional expression by controlling the expression landmark points to change slightly.

14. The method according to claim 1, wherein the generating of the avatar comprises generating the avatar by changing expression landmark points of a preset animated character such that the expression landmark points correspond to the recognized emotional information, generating the avatar by changing expression landmark points of an animated character generated on the basis of face information of the user such that the expression landmark points correspond to the recognized emotional information, or generating the avatar by combining an expression landmark point image generated in response to the recognized emotional information with a face image of the user through augmented reality.

15. The method according to claim 1, wherein the robot includes an emotion recognizer for recognizing emotional information of the user when data related to the user is input by including an artificial neural network trained to recognize emotional information on the basis of image data and audio data.

16. The method according to claim 15, wherein the emotion recognizer is trained to recognize emotional information through a plurality of unimodal inputs and a multimodal input based on the plurality of unimodal inputs and outputs a composite emotion recognition result including emotion recognition results with respect to the respective unimodal inputs and an emotion recognition result with respect to the multimodal input.

17. The method according to claim 1, wherein the recognizing of the emotional information of the user comprises:
transmitting the data related to the user to an emotion recognition server; and
receiving an emotion recognition result from the emotion recognition server,
wherein the emotion recognition server includes an artificial neural network trained to recognize emotional information on the basis of input image data and audio data.

18. The method according to claim 17, wherein the emotion recognition server includes a plurality of artificial neural networks trained with unimodal inputs and an artificial neural network trained with a multimodal input based on the unimodal inputs.

19. A robot comprising:
a camera for acquiring image data including the face of a user;
a microphone for acquiring audio data uttered by the user;
a display for displaying a predetermined image;
a speaker for outputting predetermined audio;
an emotion recognizer for recognizing emotional information of the user on the basis of the image data including the face of the user and the audio data uttered by the user; and
a controller for generating an avatar by mapping the recognized emotional information of the user to face information of the user,
wherein the recognizer
calculates probability values for each of a plurality of emotions and feature point vectors representing the plurality of emotions based on the image data including the face of the user and the audio data uttered by the user, and
concatenates the feature point vectors for the plurality of emotions to recognize the emotional information.

20. A robot comprising:
a camera for acquiring image data including the face of a user;
a microphone for acquiring audio data uttered by the user;
a display for displaying a predetermined image;
a speaker for outputting predetermined audio;
a communication part for transmitting the image data including the face of the user and the audio data uttered by the user to a server and receiving an emotion recognition result from the server; and
a controller for generating an avatar by mapping the emotional recognition result of the user to face information of the user,
wherein the server
calculates probability values for each of a plurality of emotions and feature point vectors representing the plurality of emotions based on the image data including the face of the user and the audio data uttered by the user, and
concatenates the feature point vectors for the plurality of emotions to generate the emotional recognition result.

* * * * *